(12) United States Patent
Yamamoto et al.

(10) Patent No.: US 7,595,784 B2
(45) Date of Patent: Sep. 29, 2009

(54) LIQUID CRYSTAL DISPLAY APPARATUS WITH CONTROL OF LCD AND BACKLIGHT CORRESPONDING TO AN IMAGE

(75) Inventors: Tsunenori Yamamoto, Hitachi (JP); Daisuke Kajita, Hitachi (JP); Ikuo Hiyama, Hitachinaka (JP); Akitoyo Konno, Hitachi (JP); Tatsuki Inuzuka, Mito (JP); Masatoshi Wakagi, Hitachi (JP)

(73) Assignee: Hitachi Displays, Ltd., Chiba (JP)

( * ) Notice: Subject to any disclaimer, the term of this patent is extended or adjusted under 35 U.S.C. 154(b) by 720 days.

(21) Appl. No.: 11/053,256

(22) Filed: Feb. 9, 2005

(65) Prior Publication Data

US 2005/0231457 A1 Oct. 20, 2005

(30) Foreign Application Priority Data

Feb. 9, 2004 (JP) ............................ 2004-031822
Dec. 20, 2004 (JP) ............................ 2004-366989

(51) Int. Cl.
*G09G 3/36* (2006.01)
(52) U.S. Cl. ...................................... 345/102; 345/104
(58) Field of Classification Search ................... 345/38, 345/47, 48, 63, 77, 87, 90, 102, 104, 206, 345/207, 211, 690
See application file for complete search history.

(56) References Cited

U.S. PATENT DOCUMENTS

| 5,719,643 | A  | * | 2/1998  | Nakajima ................... 348/700 |
| 5,818,553 | A  | * | 10/1998 | Koenck et al. ................ 349/61 |
| 6,111,559 | A  | * | 8/2000  | Motomura et al. ........... 345/102 |
| 6,297,797 | B1 | * | 10/2001 | Takeuchi et al. ............. 345/467 |
| 6,738,054 | B1 | * | 5/2004  | Yamaguchi .................. 345/204 |
| 6,987,499 | B2 | * | 1/2006  | Yamaguchi et al. ........... 345/89 |
| 2002/0050987 | A1 | * | 5/2002 | Sakashita .................... 345/204 |
| 2004/0008172 | A1 | * | 1/2004 | Nakamura et al. ............ 345/89 |
| 2004/0246275 | A1 | * | 12/2004 | Yoshihara et al. ........... 345/690 |
| 2005/0156867 | A1 | * | 7/2005 | Edelbrock ................... 345/102 |

(Continued)

FOREIGN PATENT DOCUMENTS

JP 06-214508 8/1994

(Continued)

OTHER PUBLICATIONS

Improving the Moving-Image Quality of TFT-LCDs (1997) Sueoka et al. p. 203-206.

(Continued)

*Primary Examiner*—Amare Mengistu
*Assistant Examiner*—Vinh T Lam
(74) *Attorney, Agent, or Firm*—Antonelli, Terry, Stout & Kraus, LLP.

(57) ABSTRACT

The liquid crystal display apparatus includes a liquid crystal display, a backlight unit for emitting rays of light of three or more colors, the ray of each color being controlled, and applying these rays of light onto the liquid crystal display. A controller is further provided for controlling a change of display data of each color of the liquid crystal display and an emitted light quantity of each color of the backlight unit at a time, based on a video signal being inputted for displaying the corresponding image and an output signal sent from an ambient light sensor for sensing ambient light.

11 Claims, 23 Drawing Sheets

U.S. PATENT DOCUMENTS

2005/0184952 A1 * 8/2005 Konno et al. ................ 345/102

FOREIGN PATENT DOCUMENTS

JP 2001142409 A * 5/2001
JP 2002-041007 2/2002

OTHER PUBLICATIONS

Technical Report of Literary Society of Electric, Information and Communication EID99-10, pp. 55-60 (Jun. 1999).

Moving Picture Quality Improvement for Hold-type AM-LCDs Digest, (2001) p. 986-989.

* cited by examiner

FIG. 10

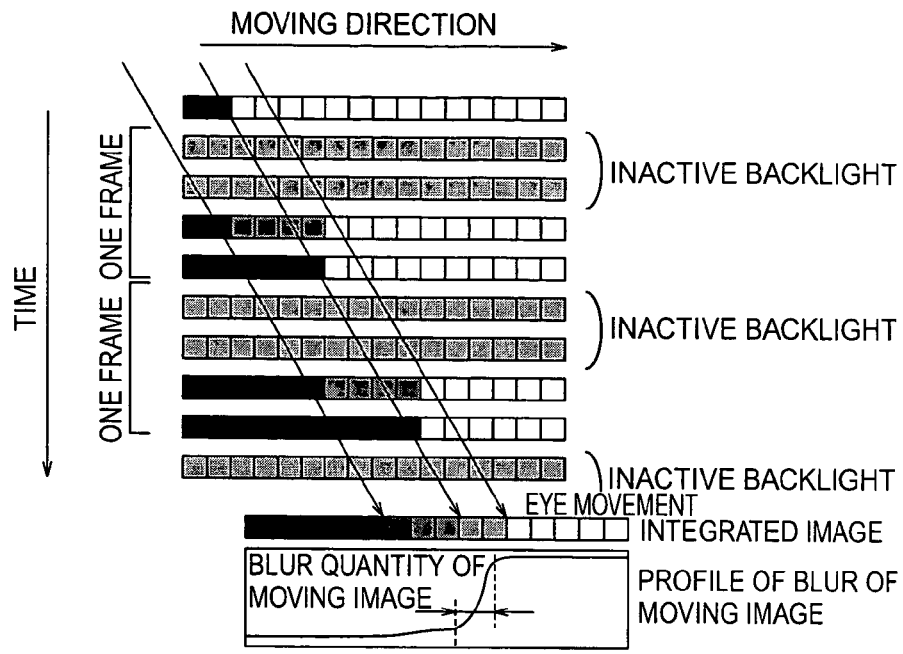

FIG. 11

| SYSTEM | IPS | VA |
|---|---|---|
| DISPLAY PRINCIPLE | BIREFRINGENCE MODE | |
| LIQUID CRYSTAL ALIGNMENT (BLACK) | PARALLEL ALIGNMENT ON SUBSTRATE SURFACE $\phi=0, \theta=0$ | VERTICAL ALIGNMENT ON SUBSTRATE SURFACE $\phi=$ UNDEFINED, $\theta=90°$ |
| TRANSMITTANCE DISPLAY SYSTEM | $T=I/I_{max}=\sin^2(2\phi)\sin^2\{\pi \Delta n(\theta)d/\lambda\}$ $\Delta n(\theta) = \dfrac{n_{//}n_\perp}{(n_{//}^2 \sin^2\theta + n_\perp^2 \cos^2\theta)^{1/2}} - n_\perp$ | |

DATA DISTRIBUTION OF
EACH COLOR BEFORE DATA CHANGE

DATA DISTRIBUTION OF
EACH COLOR AFTER DATA CHANGE

LIGHT

LIGHT

DIRECT USE OF MAX DETERMINED ON INFORMATION ON SCREEN

GRADUAL CHANGE OF MAX DETERMINED IN RESTRICTION OF MAX VARIATION BETWEEN FRAMES

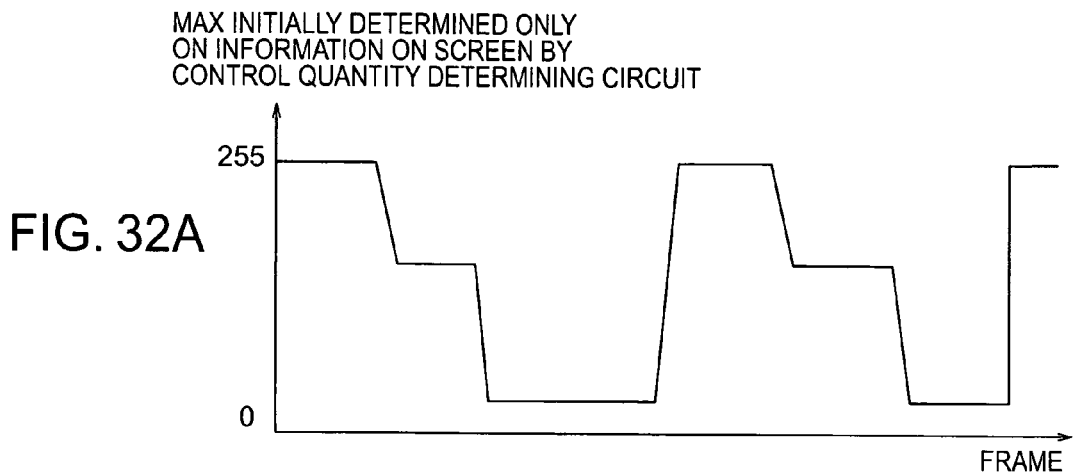
FIG. 32A — MAX INITIALLY DETERMINED ONLY ON INFORMATION ON SCREEN BY CONTROL QUANTITY DETERMINING CIRCUIT
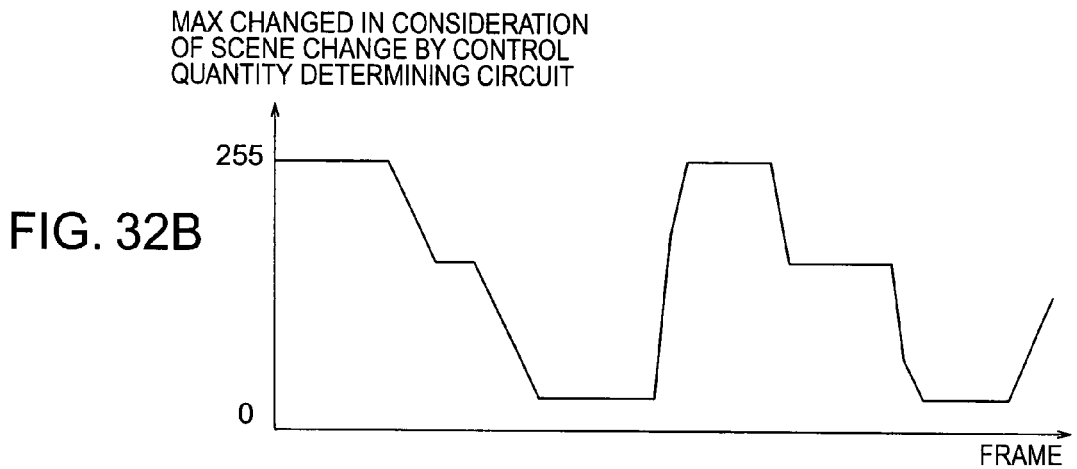
FIG. 32B — MAX CHANGED IN CONSIDERATION OF SCENE CHANGE BY CONTROL QUANTITY DETERMINING CIRCUIT
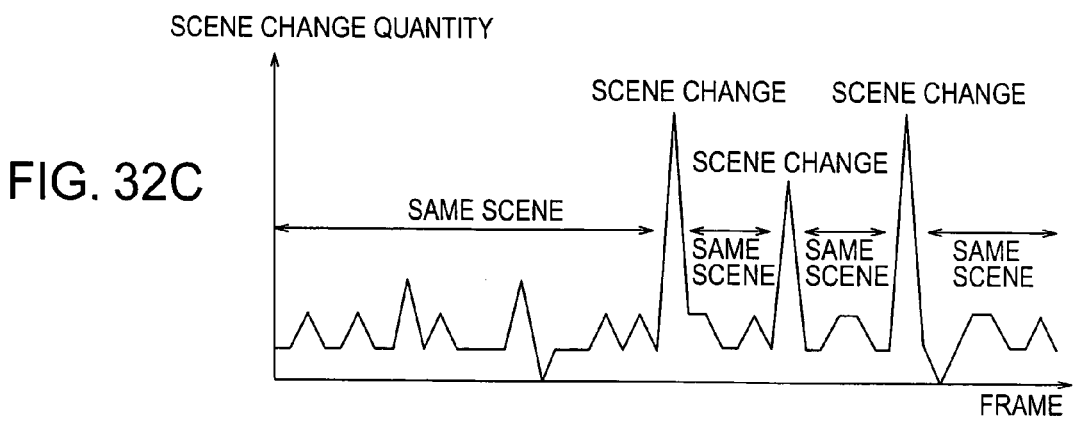
FIG. 32C — SCENE CHANGE QUANTITY

LIQUID CRYSTAL DISPLAY APPARATUS WITH CONTROL OF LCD AND BACKLIGHT CORRESPONDING TO AN IMAGE

BACKGROUND OF THE INVENTION

1. Field of the Invention

The present invention relates to a liquid crystal display apparatus which offers high display quality.

2. Description of the Related Art

The conventional liquid crystal display apparatus will be described below.

A CRT (Cathode Ray Tube) type has been heretofore on the main stream of a display apparatus. Today, however, this stream is oriented to an active matrix type LCD (Liquid Crystal Display) apparatus. This LCD is a display apparatus that utilizes light transmittance involved in liquid crystal materials without providing no light-emitting capability. It displays an image by passing through or cutting off light emitted from a backlight unit located on the rear surface of the liquid crystal material Heretofore, a fluorescent tube has been mainly used as the backlight unit of the LCD apparatus. Today, it is reported that an LED (Light-emitting Diode) is used as the backlight unit of the LCD for the purpose of improving color representability of a displayed image. For example, this technology is described in SID '02 Digest P. 1154.

The LED backlight unit described in SID '02 Digest P. 1154 needs to provide a proper feedback circuit for displaying the same color for a considerable length of time, because a red (referred simply to as "R") LED has a different temperature characteristic from a green (referred simply to as "G") LED or a blue (referred simply to as "B") LED.

On the other hand, it is reported in SID '03 Digest P. 1254 that a feedback circuit is composed of backlight sensors of three colors so that color adjustment may be executed by adjusting a luminous period of each color.

A notarized personal computer display or a desktop personal computer monitor has been heretofore on the main stream of the products to which the LCD apparatus is applied. Today, the use of the LCD apparatus is oriented to a TV receiver. An image display apparatus used in the TV receiver is required to represent an object with fidelity and beautifully as viewed by a watcher. As one example, the CRT realizes a display in a more dynamic range than a contrast ratio appearing in an overall image display by using the white-peak display characteristic.

For realizing a more visibly beautiful image on a display, in some cases, the LCD apparatus is arranged to expand a dynamic range by dynamically adjusting a contrast and a backlight luminance according to a video signal being inputted thereto as described in Japanese Patent No. 3215400 or to enhance visibility by changing a display luminance according to a measured ambient light quantity as described in JP-A-6-214508.

The LCD display is changed from black to white or white to black in response to a voltage change. In the conventional LCD apparatus, the response time of the LCD display change from black to white or white to black is as slow as 10 to 30 milliseconds. Further, the response time from white to halftone or from black to halftone is as slow as 20 to 50 milliseconds and thus is slower than the former response time. It means that an after-image phenomenon is brought about on a TV image containing lots of halftones and moving objects.

The foregoing conventional LCD apparatuses currently have a "holding type" display system that continuously outputs the same image during a period of one frame, that is, one period of a video signal.

In these "holding type" system LCD apparatus, when a moving image such as a TV image is displayed, the image that has to be moving in sequence is displayed at the same location during a period of one frame. That is, though an image at a proper location is displayed at an instant point of one frame, an image at an improper location is displayed at another instant point of one frame. That is, the displayed image is actually at another location. A watcher watches the averaged one of these images, so that the watcher may feel the image vague. This phenomenon will be discussed in detail in the technical report of the literary society of Electric, Information and Communications, EID99-10, pp. 55-60 (1999-06) or reported in SID'01 Digest, p. 986 (2001).

With respect to the response speed of the foregoing problems, there has been proposed a technology of comparing a video signal from a video signal source of a current frame with a video signal of a one previous frame, if a change between these video signals is detected, converting the video signal so that the change may be made greater and changing the display of concerned pixels according to the values corresponding with the original video signal until the next frame. This technology is discussed in SID '92 Digest, p. 601 (1992), H. Okumura et al, for example. This technology allows the speed of the halftone response to be equal to the speed of the response from white or black or vice versa, thereby being able to improve an after image when displaying a moving image.

Further, for overcoming a blur of a moving image caused by the light emission of the holding type LCD apparatus, for example, the technology of eliminating a blur portion caused by the averaging is discussed in IDRC '97 Digest, p. 203 (1997), Sueoka et al, for example. Concretely, this technology takes the steps of making the liquid crystal responsive by scanning the overall liquid crystal panel and causing the lighting device to be active thereafter.

Though the foregoing technologies have been proposed, however, for enhancing the image quality of a TV receiver provided with the LCD apparatus, that is, a liquid crystal TV, it is necessary to solve the problems involved in the background of the invention. That is, the foregoing background technologies do not meet the three respects of (1) a wide dynamic range for a well-modulated image, (2) so wide color gamut as outputting vivid colors and (3) a vivid image with no blur of a moving image, for the purpose of displaying a high-quality and visibly beautiful image on the liquid crystal TV.

It is an object of the present invention to solve the foregoing problems, that is, provide an LCD apparatus which offers a wide dynamic range and wide color gamut and no blur of a moving image when displaying an image.

SUMMARY OF THE INVENTION

In carrying out the object, according to an aspect of the present invention, an LCD apparatus includes a pair of substrates, a liquid crystal layer laid between the pair of substrates, a plurality of electrode groups for applying an electric field onto the liquid crystal layer, a plurality of active elements connected with the electrode groups, a backlight unit having a capability of controlling a ray of light of each of three or more colors, for applying a ray of light onto an LCD, and a controller for changing display data of each color on the LCD and controlling an emitted light quantity of each color of the backlight unit at a time, based on an output signal sent from a light sensor for sensing luminance of the backlight and a video signal being inputted into the LCD for displaying the corresponding image.

The controller changes display data of each color of the LCD and controls an emitted light quantity of each color of the backlight unit at a time, based on the output signal sent from the light sensor for sensing luminance of the backlight unit, the video signal being inputted into the LCD for displaying the corresponding image, and an output signal sent from an ambient light sensor for sensing ambient light.

The LCD apparatus according to the present invention is arranged to change display data of each color of the LCD and a quantity of each color ray of light emitted from the backlight unit at a time, based on the output signal sent from the light sensor for sensing light emission of the backlight unit, the video signal being inputted into the LCD for displaying the corresponding image, and the output signal sent from the ambient light sensor for sensing external ambient light. This change and control thus reduces the quantity of light of an unnecessary color emitted from the backlight unit, thereby being able to substantially expand the dynamic range and gamut and reduce a blur of a moving image. Hence, the LCD apparatus may offer a liquid crystal TV or a liquid crystal monitor which provides a capability of keeping high quality for any kind of image contents in any kind of lighting environment.

Other objects, features and advantages of the invention will become apparent from the following description of the embodiments of the invention taken in conjunction with the accompanying drawings.

BRIEF DESCRIPTION OF THE DRAWINGS

FIG. 10 is a view showing a principle of occurrence of a blurred portion of a moving image appearing when no light emission takes place for a partial period of a frame;

FIG. 11 is a view showing a principle of displaying an IPS system and a VA system liquid crystal shutters;

FIGS. 32A, 32B, 32C are views showing the limitation of a MAX variation in consideration of a scene change in the twelfth embodiment.

DESCRIPTION OF THE EMBODIMENTS

Hereafter, the preferred embodiments of the present invention will be described in detail with reference to the appended drawings.

First Embodiment

Figure 1:
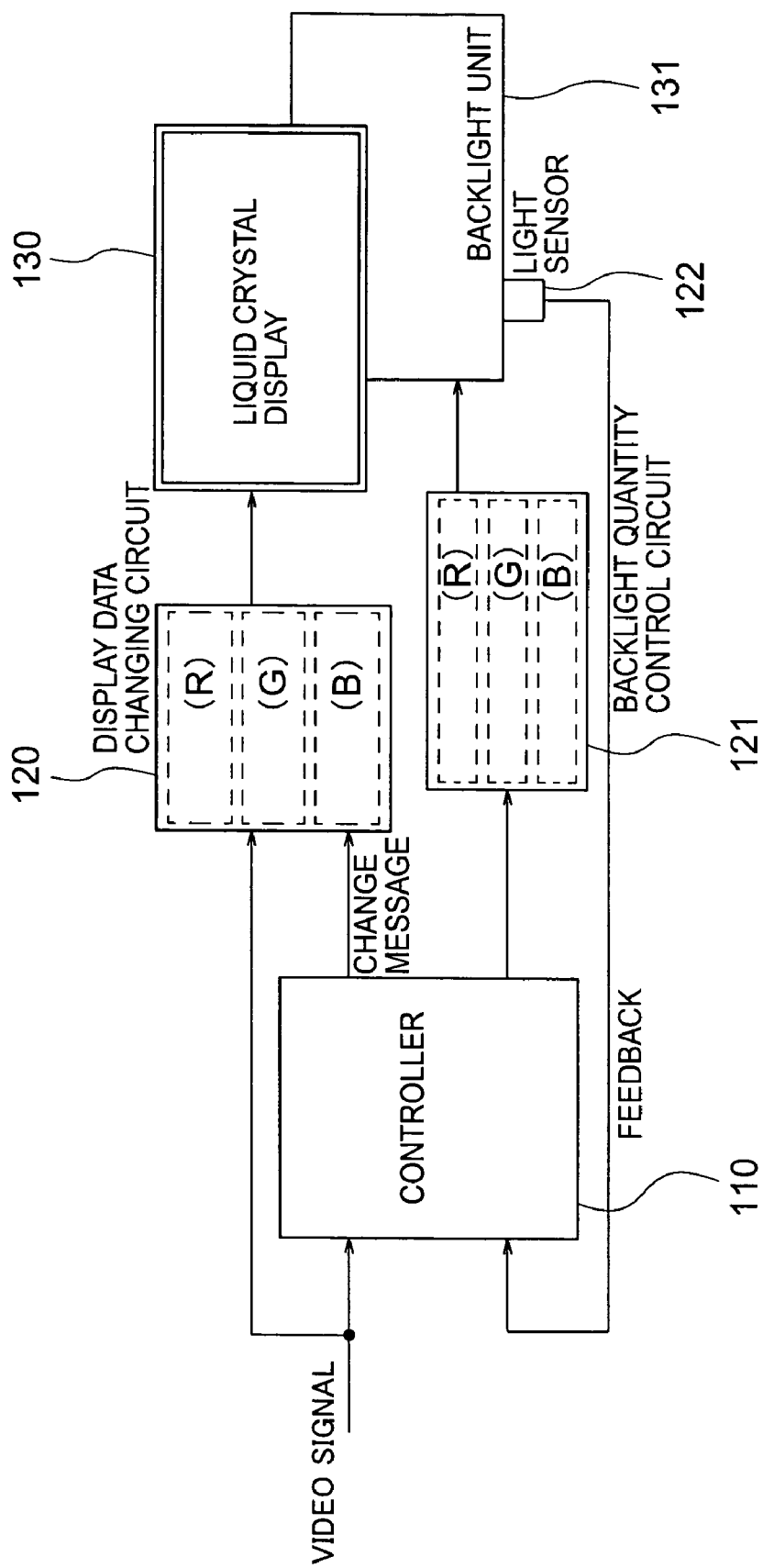
FIG. 1 is a block diagram showing an LCD apparatus according to a first embodiment of the present invention.

FIG. 1 is a block diagram showing an LCD apparatus according to the first embodiment of the present invention. The LCD apparatus includes a controller 110, a display data changing circuit 120, a backlight quantity control circuit 121, a LCD (liquid crystal display) 130, a backlight unit 131, and a backlight sensor 122. Though not shown in FIG. 1, like the prior art, the LCD includes a pair of substrates, a liquid crystal layer laid between the pair of substrates, a plurality of electrode groups for applying an electric field onto the liquid crystal layer, and a plurality of active elements being connected with these electrode groups. The LCD has the sub-pixel structures of three or more colors.

The controller 110 determines a quantity of a change of a video signal being inputted thereto and a backlight quantity at a time, based on a video signal being inputted from a personal computer or a TV tuner and a signal sent from the backlight sensor 122 for measuring a luminance intensity of red, green and blue of the backlight unit 131.

The display data changing circuit 120 includes a data conversion circuit of each display data color of red, green and blue inside itself. This circuit 120 converts the data of the inputted video signal for each color in response to the output from the controller 110 and then outputs the converted data to the LCD 130. Further, the backlight quantity control circuit 121 includes a light controller of each color of red, green and blue inside itself and controls the light emission of each color of the backlight unit 131 in response to the output from the controller 110.

Figure 2:
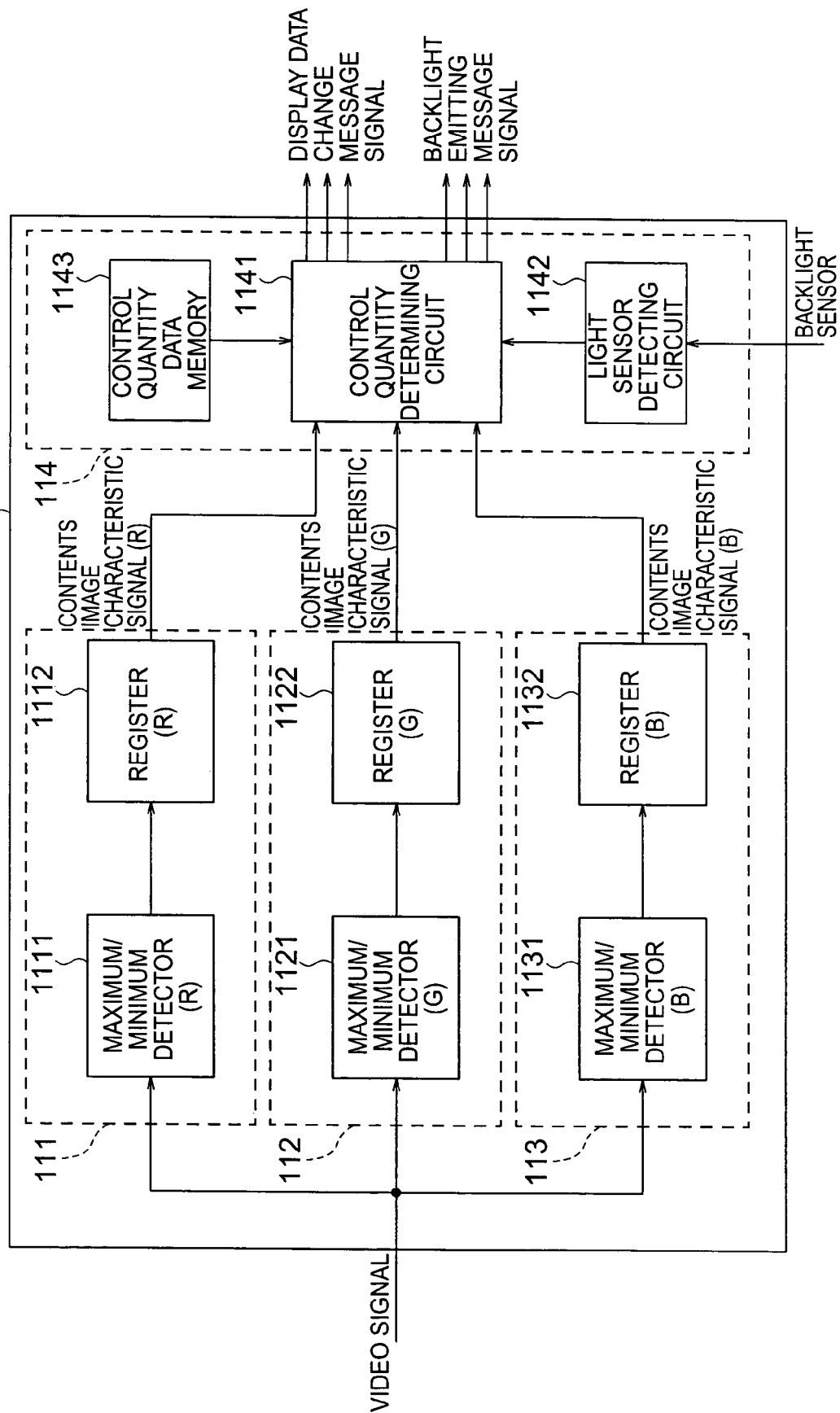
FIG. 2 is an internal block diagram showing a controller 110 shown in FIG. 1.

FIG. 2 is an internal block diagram showing the controller 110. Inside the controller 110 is located three circuits for analyzing an inputted video signal according to the primary colors of red, green and blue, concretely, a display contents analyzing circuit 111 for analyzing data of a red video signal, a display contents analyzing circuit 112 for analyzing data of a green video signal, and a display contents analyzing circuit 113 for analyzing data of a blue video signal. Further, an image quality controller 114 is provided for determining the data conversion quantity and the backlight quantity from the analyzed results of the video signal data of each color.

The display contents analyzing circuits of the primary colors 111, 112 and 113 are composed of maximum/minimum detectors 1111, 1121 and 1131 for detecting a maximum value and a minimum value of one-display data and registers 1112, 1122 and 1132 for storing the detected data, respectively. In this embodiment, the detectors are arranged to detect only the maximum value and the minimum value. Instead, these detectors may be arranged to detect a distribution of one-display data. The data for indicating the characteristics of the contents image on the display are stored in the registers 1112, 1122 and 1132. The data is updated at each frame.

On the other hand, the image quality controller 114 is composed of a light sensor detector 1142 that is inputted with a signal from the backlight sensor 122, a control quantity data memory 1143 for storing the tone luminance characteristics of the LCD 130 and the luminance characteristics of the backlight unit 131, and a control quantity determining circuit 1141 for controlling a quantity of a display data change message signal to be outputted and a quantity of a backlight activating message signal based on the information sent from the light sensor detector 1142 and the control quantity data memory 1143 and the contents image being inputted thereto.

Figure 3:
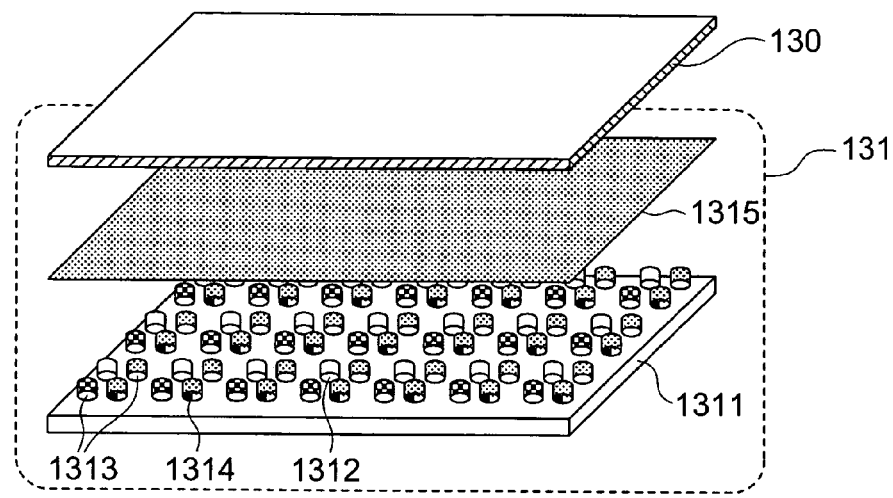
FIG. 3 is a view showing a composition of an LCD 130 and a backlight unit 131 shown in FIG. 1.

FIG. 3 shows a composition of the LCD 130 and the backlight unit 131. The backlight unit 131 is composed of a backlight frame 1311, a plurality of combinations of light-emitting diodes, each combination of a red light-emitting diode 1312, two green light-emitting diodes 1313 and a blue light-emitting diode 1314, ranged one-dimensionally on the backlight frame 1311, and a light-diffusing plate 1315 located under the LCD 130 and on the plurality of combinations of light-emitting diodes. The light-emitting diodes of each color may be controlled independently. The backlight quantity controller 121 for controlling these light-emitting diodes utilizes a pulse-width modulating system for modulating the length of time when the diodes are active as means of controlling a luminous intensity.

As described above, this embodiment provides the display contents analyzing controller, the display data changing circuit 120, and the backlight quantity controller 121 for each of the display data colors. Hence, this embodiment may select a proper combination of display data and backlight quantity to each of the display data colors, that is, red, green and blue.

For example, assuming that the red data inputted as the display data is 128 tones or less in the range of 0 to 255 tones in the one-display signal, if the tone to luminance characteristic ($\gamma$ characteristic) of the LCD 130 is 2.2 (luminance=tone$^{2.2}$), the maximum luminance (128 tones) to be displayed is a quarter or less of 255 tones. In this case, by adjusting the light quantity of the backlight unit 131 to be a quarter or less and changing the display data from 128 to 255 tones, it is possible to keep the luminance around the black pixels a quarter of the luminance in the normal display, thereby being able to substantially widen the dynamic range. The system of analyzing the inputted image and both changing the display data and adjusting the backlight quantity at a time based on the analyzed result for enhancing the image quality has been disclosed in the foregoing patent publication 1.

In this embodiment, the foregoing control may be executed for each of the display data colors (red, green and blue). However, if the three conventional systems are prepared so that these systems may be executed for each color, the image quality is degraded. This is because the controls for red, green and blue are not completely independent in the LCD apparatus. This will be discussed with reference to FIG. 4.

Figure 4:
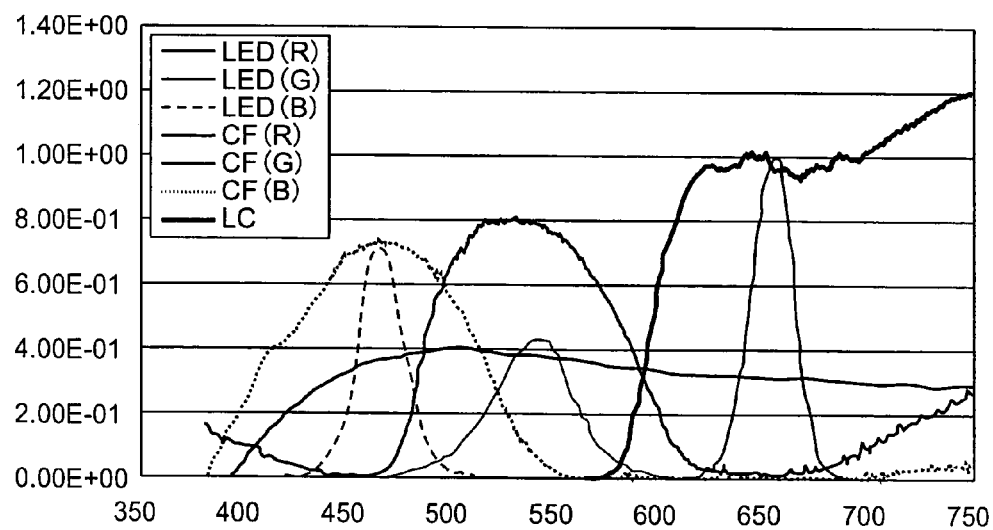
FIG. 4 is a graph showing a spectral characteristic of the LCD 130 shown in FIG. 1.

FIG. 4 shows the spectral transmittance characteristics of the red, green and blue color filters used in the LCD 130 and the spectral luminance distribution of the red, green and blue light-emitting diode elements used in the backlight unit 131. Further, the spectral transmittance characteristic of the liquid crystal layer is also indicated. In the graph, an axis of abscissa denotes a light wavelength, while an axis of ordinate denotes a transmittance or a luminous intensity at any unit.

As will be grasped from FIG. 4, the red color filter (CF(R)) has an area of about 580 nm or more as a transmission area. The green color filter (CF(G)) has an area of about 470 nm or more to about 620 nm or less as a transmission area. The blue color filter (CF(B)) has an area of about 370 nm or more to about 540 nm or less as a transmission area. In the light-emitting diode element, on the other hand, the red (CF(R)) has as a transmission area an area about ±30 nm with about 650 nm as a center. The green (LED(G)) has as a transmission area about ±50 nm with about 545 nm as a center. The blue (LED (B)) has as a transmission area about ±30 nm with 475 nm as a center.

Herein, no complete separation of a blue ray of light from a green ray of light brings about a problem. As is viewed from FIG. 4, it is understood that a part of light of the green light-emitting diode passes through not only the green color filter but also the blue color filter. Conversely, it is indicated that a part of light of the blue light-emitting diode passes through the green color filter. That is, though the green light is substantially separated from the red light, the green light is not independent of the blue light but is correlated therewith.

Of course, this phenomenon depends upon the spectral transmittance characteristics of the color filters and the luminous characteristics of the light-emitting diodes. It means that this phenomenon may be overcome if the characteristics of the color filters become more excellent. In fact, however, since the color filter is manufactured by using pigment or dying system pigment, it is quite difficult to manufacture the color filter having any wavelength range.

With respect to the light-emitting diodes used as a light source of the backlight unit 131 in the first embodiment, the dependency of a luminous characteristic on a temperature is specific to each color of red, green and blue and the change of a luminous intensity caused by the change of a temperature immediately after lit up is specific to each color. Hence, it is necessary to monitor the luminous characteristic of the backlight unit 131 through the sensor, because the different display result from the estimated result may appear. In particular, since the green light is not controlled independently of the blue light, there is a high possibility that the estimated color does not appear. The light source in which a spectral luminous distribution is changed by the change of the temperature is not limited to the light-emitting diodes. Lots of light sources except a laser source change their spectral luminous distributions by the temperature change or the change of voltage and current.

Under these circumstances, the present embodiment provides three systems of a circuit for analyzing an inputted video signal, a circuit for changing data displayed on the LCD and a circuit for controlling an emitted light quantity of a backlight unit. Each system concerns with each color of red, green and blue. However, just one controller is provided for determining a changing quantity of display data and an emitted light quantity of the backlight unit. This controller is operated on the analyzed result of the three input video signals. This means that the three systems may be controlled not independently but correlatively.

Further, the controller is connected with sensors for sensing the red, green and blue luminous intensities of the backlight unit so that the controller may control a changing quantity of display data and an emitted light quantity of the backlight unit properly and precisely.

Figure 5:
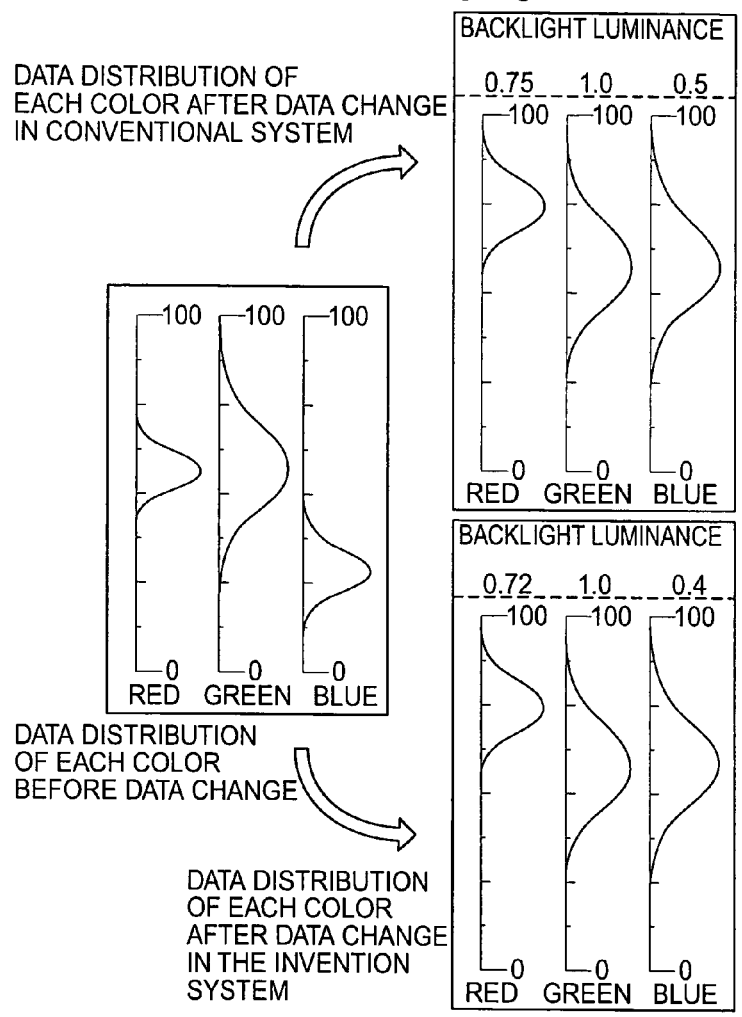
FIG. 5 is a graph showing an example of a comparison of the display data conversion between the prior art and the present invention.

With respect to the change of display data and the control of an emitted light quantity of the backlight unit in the present invention, one example is shown in FIG. 5. The left-hand part of FIG. 5 indicates the inputted display data information. This data is inputted in the condition that the luminance of the backlight is constant.

The change of display data and the control of an emitted light quantity of the backlight unit in the case of processing the foregoing data in the conventional independent three systems for red, green and blue is exemplarily shown in the upper right portion of FIG. 5. The display data is changed so as to detect a maximum level of brightness in the inputted data for each color (in FIG. 5, red is 75%, green is 100%, and blue is 50%) and to expand the detected level into the brightness level of 100%. At a time, the emitted light quantity of the backlight unit is controlled so that the display luminance at the level of 100% may be equal to the luminance estimated by the detected maximum brightness level.

As is viewed from FIG. 5, in the inputted data, the color of red reaches 75% brightness level at maximum. This inputted data is expanded to 100% at maximum so that the emitted light quantity of the backlight unit is 0.75. With respect to the color of green, no change is caused because the maximum level of the inputted data is 100%. With respect to the color of blue, since the maximum level of the inputted data is 50%, the data is expanded to 100% at maximum so that the emitted light quantity of the backlight unit becomes 0.5.

The foregoing description concerns with the processing of the inputted data through the conventional independent three systems. In this processing, however, no correlation between green and blue is considered. In fact, therefore, the blue display is brighter than the estimated brightness of a blue color display by the ray of green light (because the blue backlight is lower in quantity, while the green backlight is not lower in quantity). Further, the brightness of the green display is a little lower than the estimated brightness thereof because the blue backlight becomes smaller in quantity. On the other hand, no influence is given to the color of red. As a result, the RGB is kept unbalanced, so that the precise color representability may not be realized and thereby the image quality may be degraded.

In this embodiment, for modifying the foregoing disadvantage, at first, the quantity of the blue backlight is made lower from 0.5 to 0.4 in consideration of diffraction of the blue backlight from the green backlight. Then, in order to keep the quantity of the red backlight suitable to the green and the blue displays whose brightness is lower, the quantity of the red backlight is modified from 0.75 to 0.72.

Further, the light diffracted from the green backlight into the blue display serves to lower color purity of the blue display. Hence, the blue data is wholly expanded on the display. The foregoing blue backlight quantity of 0.4 is a numeric value derived in consideration of this data expansion. The color balance of the RGB is substantially same as that estimated by the inputted data. This results in improving the degraded color purity and preventing the image quality from being degraded.

As described above, in a case that the change of display data and the emitted light quantity of the backlight unit are precisely controlled with respect to each color, in addition to the effect of widening the dynamic range in the display device, it is possible to widen the gamut and suppress a blur of a moving image, thereby being able to enhance the image quality of the moving image.

At first, the expansion of the color representability will be described with reference to FIG. 6. In a case that the light-emitting diodes are used as a light source, since the light-emitting diodes offer higher color purities of red, green and blue than the cathode-ray tubes (fluorescent tubes) conventionally used as the light source, those light-emitting diodes offer a wider gamut. The present embodiment concerns with this advantage. This is not the gamut to be described below but the gamut in a low luminance area.

In a case that the luminous control of the backlight cannot be executed with respect to each color of red, green and blue, it means that the three colors are kept at the substantially same luminous level. FIG. 6 shows the result of measuring a chromaticity as changing only one color in the range of several tones with the tones of the other two colors in the LCD 130 being zero, that is, the black display in the foregoing same luminous state. An axis of abscissa denotes u' of CIE 1976 and an axis of ordinate denotes v' thereof.

Figure 6:
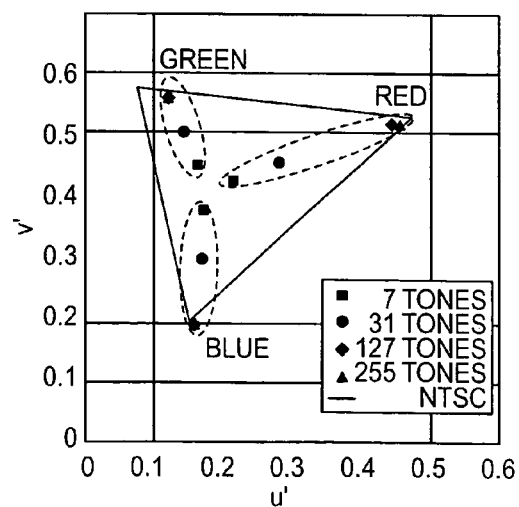
FIG. 6 is a graph showing tone dependency of color coordinates of a single color (red, green or blue) in the LCD.

As shown in FIG. 6, according to the lower tones, for example, at a 7th tone or 31st tone, the color purity of each color is degraded so that the gamut is made narrower. This is because the liquid crystal at the tone 0, that is, the black display does not completely cut off all the rays of light but passes through a certain degree of light. The passed degree of light is not negligible in the low luminance range.

On the other hand, as described with respect to FIG. 5, according to this embodiment, the luminous quantities of the three colors of the backlight may be precisely controlled though the blue and the green colors are correlated with each other and the quantity of the backlight may be lowered to a practically minimum level. Hence, by keeping a leakage of an unnecessary ray of light at low tone to a minimum, it is possible to widen the gamut.

In turn, the description will be oriented to improvement of quality of a moving image. In the display (referred to as a "holding type luminous display") that continuously displays one screen as holding the same screen image until the next rewrite such as the LCD apparatus, the constantly moving image is displayed by the advance of a frame for each rewrite period (referred to as "one frame"). The human's eyes continuously follow the advance of frames one by one. Hence, the mismatch between a line of sight and a displayed object causes an edge portion of a moving image to be blurred.

The foregoing principles are discussed in detail in the non-patent publication 5 or the non-patent publication 6. These principles will be briefly described with reference to FIG. 7. As indicated in the left hand of FIG. 7, it is assumed that a black square is moving from left to right in the white background. Considering expansion of an edge portion changing from white to black, if four pixels are advanced for one frame, the same display during one frame is kept on the LCD. However, the human's line of sight is continuously advancing, so that the human's eyes recognize the displayed image as an integrated brightness. Hence, the edge portion is caused to be blurred.

Herein, in some display devices such as a CRT, a ray of light is fired at a certain instant point (impulse type display) and the non-luminous state is in the other part of the display. Hence, even if the human's eyes continuously advance, the non-luminous display is not integrated, which disallows a blurred portion to appear.

Figure 7:
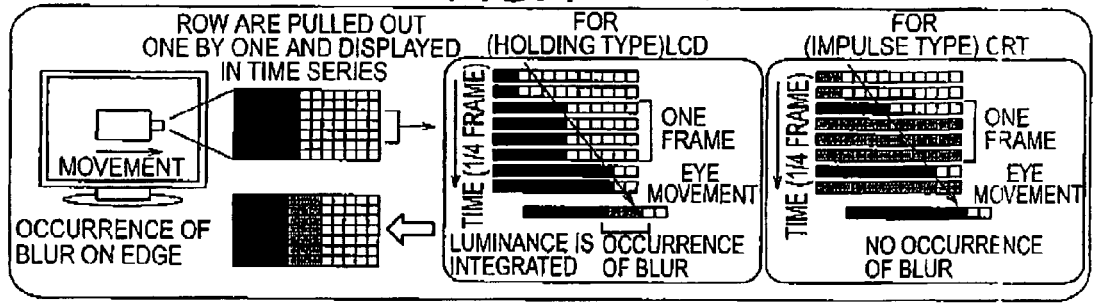
FIG. 7 is a view showing a principle of occurrence of a blurred moving image when displaying a moving image on the LCD.

The view of FIG. 7 illustrates that the liquid crystal is ideal in response and instantaneously changes from white to black. For the holding type luminous display, however, the blur of a moving image is brought about. In actual, the response of the liquid crystal needs a considerably length of time, so that the blur of a moving image may be made larger. This phenomenon is shown in FIG. 8.

Figure 8:
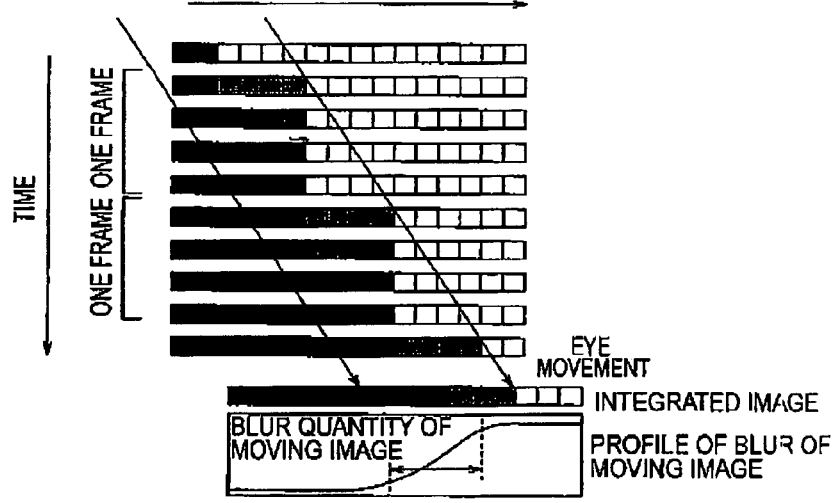
FIG. 8 is a view showing a principle of occurrence of a blurred moving image appearing in the case of considering a liquid crystal response characteristic of the LCD.

FIG. 8 is a conceptual view showing a blur of a moving image in a case that the response of the liquid crystal from white to black is terminated in about one-frame time. The blur quantity of the moving image is made larger than that shown in FIG. 7. That is, the blur quantity of the moving image depends upon the response speed and the frame period of the liquid crystal. The dependency of the blur quantity on the liquid crystal response speed and the frame period is shown in FIG. 9.

Figure 9:
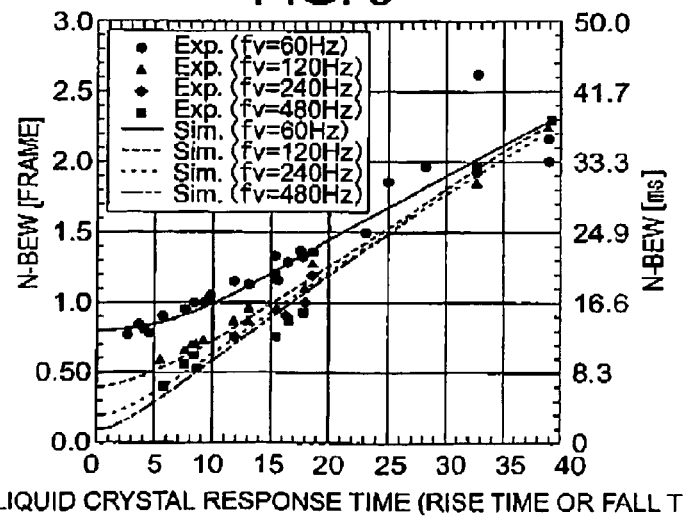
FIG. 9 is a graph showing relation among a blur quantity of a moving image, a liquid crystal response speed, and a frame period in the LCD.

In FIG. 9, an axis of abscissa denotes a response speed of liquid crystal. An axis of ordinate denotes a blur quantity of a moving image. The frame period is indicated by the difference of a line kind or a plot. (The frame frequency fv=60 Hz is an ordinary frame in which one frame=16.6 milliseconds. In the frame frequency fv=120 Hz, one frame=8.3 milliseconds or some). As viewed from FIG. 9, the blur quantity of a moving image may be improved by speeding up the response as well as shortening the frame period.

By reducing a luminous ratio during a one-frame period in place of shortening the frame period, the blur quantity of a moving image may be improved. This means that the holding type luminance is made closer to the impulse type luminance. Reduction of the luminous ratio into 50% is the same as reduction of a frame period into a half. Reduction of the luminous ratio into 25% is equivalent to reduction of the frame period into 25%. The concept of the blurred moving image appearing when the luminous ratio of FIG. 8 is reduced into 50% is illustrated in FIG. 10. It is understood from FIG. 10 that the blur quantity of the moving image shown in FIG. 10 is far smaller than that shown in FIG. 8.

As described above, it is effective to shorten the luminous time of the backlight unit for improving the blurred moving image. On the other hand, this embodiment is arranged to precisely control a backlight quantity of of each color. In this control, the light emission of the light-emitting diodes is adjusted through the pulse width modulation. Hence, in the case of adjusting the light emission as keeping the backlight white or adjusting the light emission of a sole color of red, green or blue, it is possible to reduce the light quantity and thereby shorten the luminous time.

In this embodiment, the foregoing adjustments make it possible to forcibly restrict occurrence of a blurred portion of a moving image in the holding type luminous display. This results in being able to display a very vivid moving image.

In turn, the description will be oriented to the LCD 130 used in this embodiment. As the liquid crystal used in the LCD 130 is used the liquid crystal of the so-called in-plane switching system in which when no electric field is applied, the major axes of the liquid crystal molecules are aligned on the plane in parallel to the substrate and a group of electrodes located only on one substrate applies an electric field onto those liquid crystal molecules. This liquid crystal is referred to as the IPS system liquid crystal.

Today, for a liquid crystal TV or a high-quality liquid crystal monitor are mainly used an IPS system LCD or a vertical alignment system LCD. The IPS system LCD includes a wide view field angle. The vertical alignment (VA) system LCD is arranged so that the major axes of the liquid crystal molecules are aligned perpendicularly to the substrate when no electric field is applied and a group of electrodes located on each of the two substrates applies an electric field onto the liquid crystal molecules.

Both of these two liquid crystal systems utilize a diffuser and a birefringence characteristic of the liquid crystal for realizing an optical shutter function. The difference between these two systems is shown in FIG. 11. In the expression that indicates a transmittance, the IPS system changes its transmittance by changing a term of φ through an electric field, while the VA system changes its transmittance by changing a term of θ through an electric field.

The change of tone in the IPS system corresponds to the change of a φ value. Since there exists no term about a wavelength in this term, the change of a spectral transmittance of liquid crystal caused by the change of tone is small. This is the feature of the IPS system, which is shown in FIG. 12.

Figure 12:
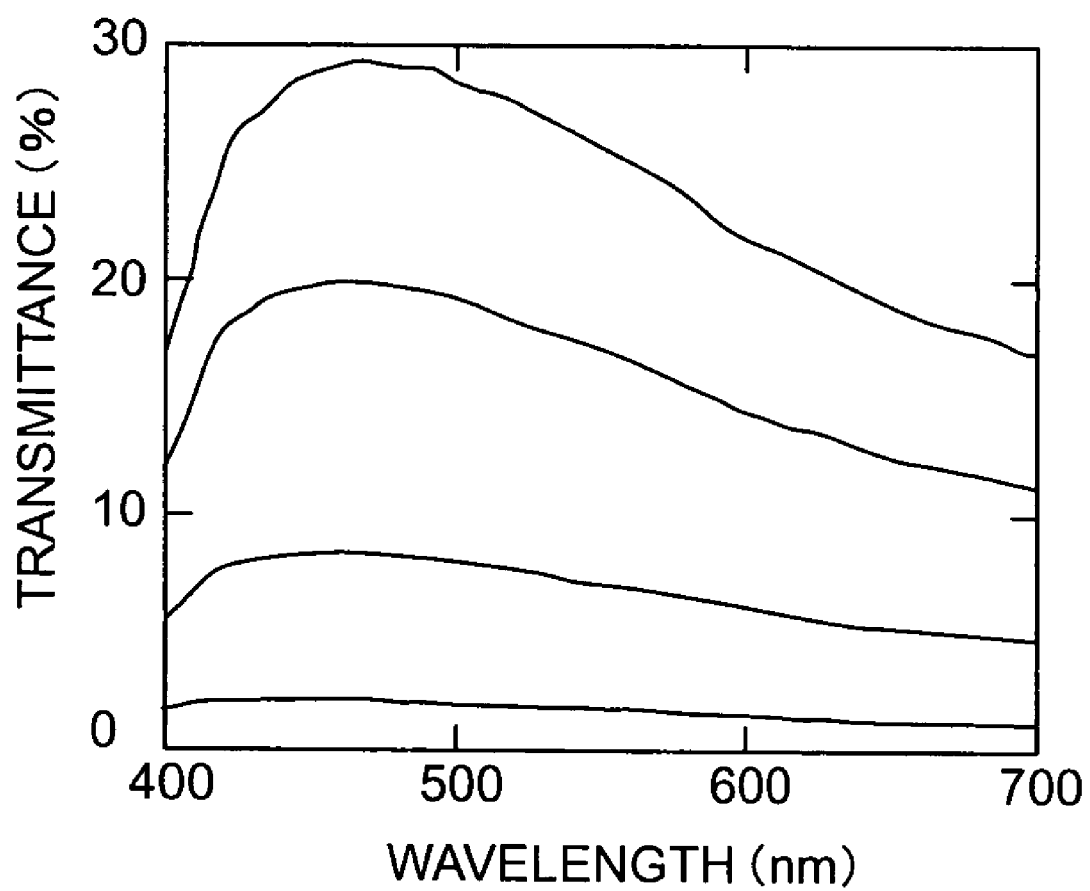
FIG. 12 is a view showing dependency of tone on spectral transmittance of the LCD 130.

FIG. 12 shows dependency of spectral transmittance distribution on tone in the IPS system liquid crystal used in this embodiment. The spectral transmittance is divided into four tones from a low tone to a high one. The distribution of each spectral transmittance has a substantially same shape as each other. The other liquid crystal systems hardly indicate this kind of similarly shaped distribution to each other.

The small change of tone in the spectral transmittance distribution corresponds to more accurate representation of an image displayed under the control of the controller 110. It means that the resulting LCD apparatus may output a high-quality image.

As described above, the LCD apparatus according to this embodiment includes display contents analyzing circuits 111, 112 and 113 for analyzing a video signal to be inputted for displaying the corresponding image on a LCD 130, a light sensor 122 for sensing a ray of light emitted from a backlight unit 131, an image quality controller 114 for controlling a changing quantity of display data and a quantity of backlight based on signals sent from the display contents analyzing circuits 111, 112 and 113 and the light sensor 133, a display data changing circuit 120 for changing display data of each color through an output from the image quality controller 114, a backlight controlling circuit 121 for controlling a backlight quantity of each color through a pulse width modulation in response to the output from the image quality controller 114, and the backlight unit 131 having a light source composed of red, green and blue light-emitting diodes.

That is, the controller 110 changes the display data of each color of the LCD 130 and controls the quantity of each color light emitted from the backlight unit 131 in consideration of the correlation of the colors, based on the output signal from the light sensor 122 and the video signal of each color inputted for displaying the corresponding image.

This control allows the LCD apparatus of this embodiment to widen the dynamic range of the displayed image, secure a wider gamut even in a low tone area, and display a vivid image with no blurred portion of a moving image. Further, the use of the IPS system liquid crystal in the LCD makes it possible to reduce a color shift even in the tone change, thereby being able to enhance the image quality more.

Second Embodiment

Figure 13:
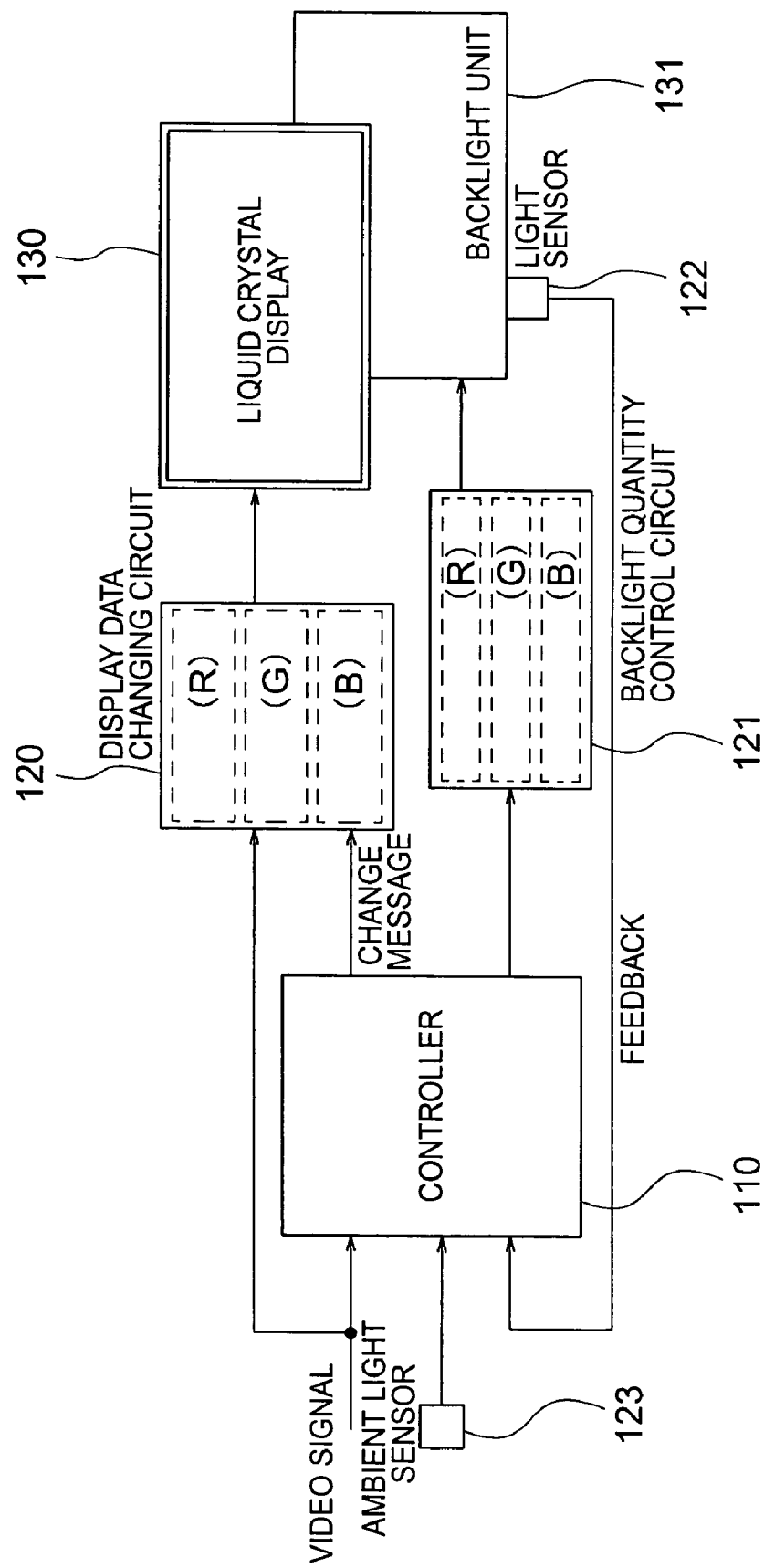
FIG. 13 is a block diagram showing an LCD apparatus according to a second embodiment of the present invention.

FIG. 13 is a block diagram showing the LCD apparatus according to the second embodiment. The different respect of this embodiment from the first embodiment is that a signal sent from an ambient light sensor 123 for sensing a lighting state of the environment around the LCD apparatus is inputted into the LCD apparatus in addition to the image signal to be displayed as information to be inputted into the controller 110 and the signal sent from the light sensor 122.

Figure 14:
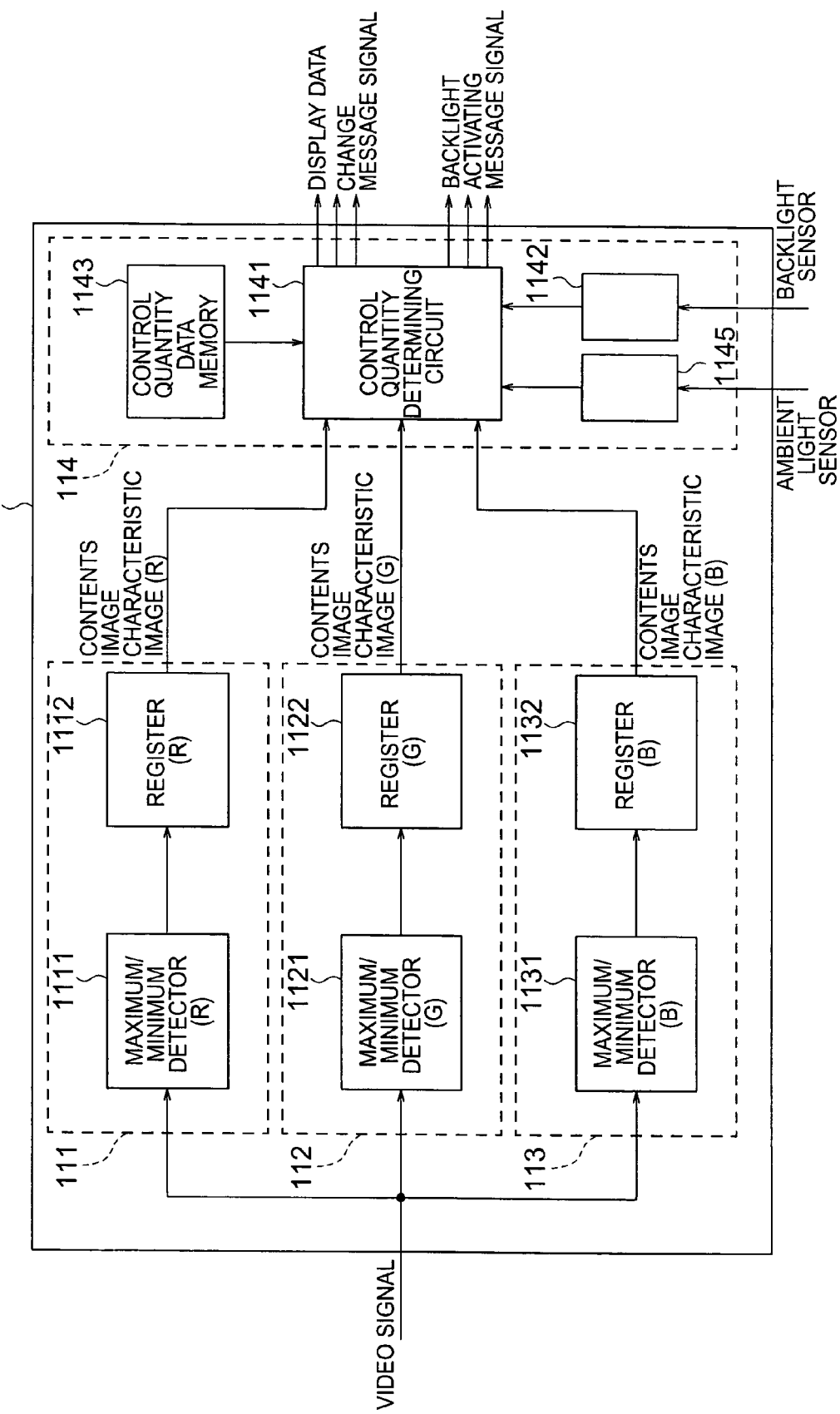
FIG. 14 is an internal block diagram showing a controller 110 shown in FIG. 13.

The internal block diagram of a controller 110 included in this embodiment is shown in FIG. 14. The different respect of FIG. 14 from FIG. 2 is that a backlight sensor detecting circuit 1144 being inputted with a signal from the light sensor 122 and an ambient light sensor detecting circuit 1145 being inputted with a signal from the ambient light sensor 123 are located in the image quality controller 114 and the signals from the two light sensors are connected with each other.

As the environments where a liquid crystal TV or a liquid crystal monitor is used, various places may be assumed, for example, a gloomy room such as a midnight living room where all lights are turned off or a room for a medical facility with about 1 Lx ambient light to a bright room such as a living room exposed to the afternoon sun or an office environment with several hundreds Lx ambient light. In the bright room, a brighter display is outputted because the gloomier tones are likely to be considered as one luminance without distinguishing those tones from each other. In the gloomier room, a gloomy portion may be recognized well by reducing too much brightness and expanding a portion of gloomier tones.

The technology of sensing the condition of the ambient light and changing the displayed image through the sensed information is described in the patent publication 2. This embodiment is arranged to control the changing quantity of display data of each color and the quantity of the backlight in consideration of the correlation of these colors, based on the analyzed result of display data of each color and the output of the light sensor as in the first embodiment and an output of the light sensor for sensing a lighting state of the environment around the LCD apparatus.

This allows a changing quantity of display data and a backlight quantity to be more accurately controlled. This results in being able to widen a dynamic range on the display, secure a wider representable range because of suppressing the unnecessary backlight, and enhance performance of a moving image on the display by suppressing a blur of a moving image when displaying a moving image.

As described above, the LCD apparatus according to this embodiment includes the display contents analyzing circuits 111, 112 and 113 for analyzing a video signal being inputted for displaying the corresponding image on the LCD, the light sensor 122 for sensing a ray of light emitted from the backlight unit 131, the ambient light sensor 123 for sensing ambient light, the image quality controller 114 for controlling a changing quantity of display data and a backlight quantity based on the signals sent from the display contents analyzing circuits 111, 112 and 113 and the light sensor 122, a display data changing circuit 120 for changing display data of each color based on the output sent from the image quality controller 114, the backlight quantity controller 121 for controlling a backlight quantity of each color through a pulse width modulation in response to the output sent from the image quality controller 114, and the backlight unit 131 having as a light source the light-emitting diodes of red, green and blue.

That is, based on the output signal sent from the light sensor 122, the video signal of each color being inputted for displaying the corresponding image and the output signal from the ambient light sensor 123 for sensing ambient light, the controller 110 controls a change of display data of each color on the LCD 130 and a quantity of each color light emitted from the backlight unit 131 at a time.

This control results in realizing the LCD apparatus that has a wider dynamic range of the displayed image according to the environment around the LCD apparatus itself, a wider gamut even in a low tone area, and a capability of displaying a more vivid image with no blur appearing on a moving image. Further, since the LCD utilizes the IPS system liquid crystal, the LCD apparatus enables to reduce a color shift caused by a gray scale, thereby being able to enhance the quality of the displayed image.

Third Embodiment

This embodiment is the same as the first embodiment except the following respects. In this embodiment, the VA system liquid crystal is used for the LCD 130. In the VA system liquid crystal, when no electric field is applied, the major axes of the liquid crystal molecules are aligned perpendicularly to the substrate and are not oriented in a specific direction on the plane. Hence, for displaying a black image, the polarizing axes of the upper and the lower diffusers having a liquid crystal layer laid therebetween are merely crossed with each other at right angles. That is, it is not necessary to match the angles of the liquid crystal layer to that of the diffusers with accuracy. Hence, the VA system liquid crystal is allowed to lower its transmittance of a black color as compared with any other system liquid crystal.

The lower transmittance in black display makes it possible to reduce light leakage in the display of a sole color of red, green and blue. This results in enhancing the color representability in low luminance.

As described above, the LCD apparatus according to this embodiment has the same arrangement as the first embodiment. Hence, this embodiment offers the LCD apparatus that has a wider dynamic range on a displayed image and a wider gamut even in a low tone area and enables to display a more vivid image with no blur appearing on a moving image. Further, the use of the VA system liquid crystal in the LCD allows the gamut in the low tone area to be wider. This results in enhancing the image quality of the LCD apparatus.

Also in this embodiment, apparently, like the second embodiment, the addition of the sensor for sensing ambient light makes it possible to suit the display to the environment around the LCD apparatus with accuracy.

Fourth Embodiment

This embodiment is the same as the second embodiment except the following respects. In this embodiment, basically, like the second embodiment, the controller 110 controls a changing quantity of display data and a backlight quantity based on the signals from the light sensor 122 and the ambient light sensor 123. However, unlike the second embodiment, in response to an instruction from the controller 110, the display data changing circuit 120 is instructed to output to the LCD 130 the display data defined in a specific range of the tone characteristic.

Concretely, assuming that the tone characteristic of the LCD 130 ranges from 0 to 255, the inputted image data is converted into the image data in the tone characteristic range of 100 or more when it is outputted. This will be described with reference to FIG. 15.

Figure 15:
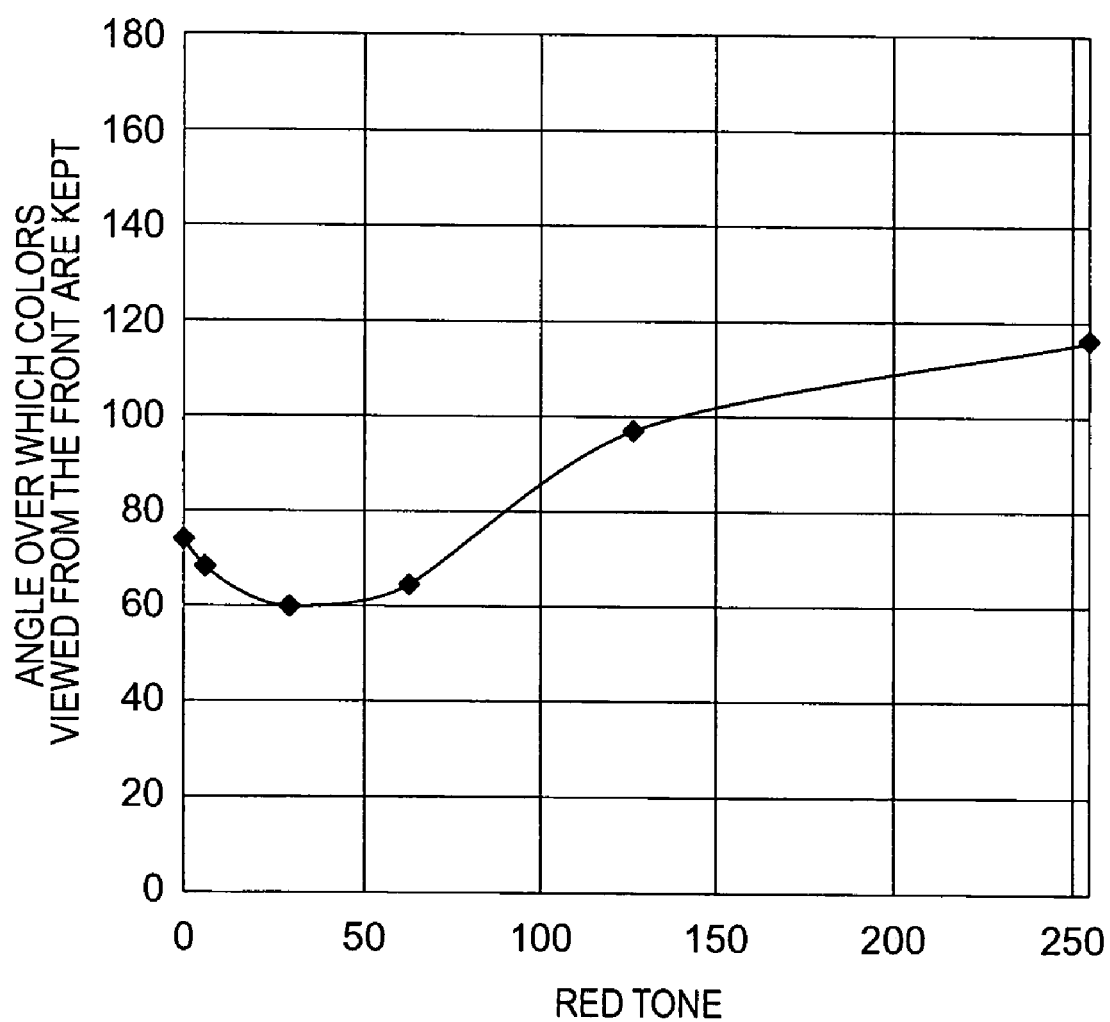
FIG. 15 is a graph showing a characteristic of a tone to a color difference field angle in the LCD 130.

In FIG. 15, an axis of abscissa is a red tone (a sole red color in this figure) and an axis of ordinate is an angle over which a color appearing when viewing the LCD 130 from the front is kept viewed in a case that the display is viewed in various directions such as laterally or in the upper oblique direction. That is, about a certain image, it is an angle range in which a user can visually sense the same colors as the colors appearing on the display when the user views the display from the front. The angle range is derived in the condition that a squared and averaged value of a difference between the CIE1976u'v' chromaticity coordinate value measured from the front and the u'v' chromaticity coordinate value measured as changing the angle is 0.02 or less. Afterwards, this is called a chromatic viewing angle characteristic.

As is understood from FIG. 15, the IPS system liquid crystal used in this embodiment is excellent in the chromatic viewing angle characteristic in the area of 100 or more of 255 tones but is less excellent in the area of less than 100 tones. Hence, in a case that the IPS system liquid crystal is used for the LCD 130 like this embodiment, the basic use of the area of 100 or more of overall 255 tones makes it possible to keep the chromatic viewing angle characteristic excellent.

In this embodiment, for realizing the foregoing state, the controller 110 merely instructs the display data changing circuit 120 to define the display data to be outputted to the LCD 130 in a specific range of 100 or more of overall 255 tones.

As described above, like the second embodiment, the LCD apparatus according to this embodiment provides a capability of having a wider dynamic range of a displayed image according to the environment around the LCD apparatus, a wider gamut even in a low tone area and displaying a vivid image with no blur appearing on a moving image. Further, the specific range of 100 or more tones in the tone characteristic are mainly used for the changed display data to be outputted to the LCD. Hence, the LCD apparatus according to this embodiment enables to widen the angle range over which the user visually senses the same colors as the colors appearing when the user views the display from the front, thereby being able to enhance the image quality more.

Fifth Embodiment

The fifth embodiment is the same as the third embodiment except the following respects. In this embodiment, basically, like the third embodiment, the controller 110 controls a changing quantity of display data and a backlight quantity based on the signals from the light sensor 122 and the ambient light sensor 123. However, unlike the third embodiment, in response to an instruction from the controller 110, the display data changing circuit 120 is instructed to output to the LCD 130 the display data defined in a specific range of the tone characteristic.

Concretely, assuming that the tone characteristic of the LCD 130 ranges from 0 to 255, the inputted image data is converted into the image data defined in the range except 20 to 80 tones when it is outputted. This will be described with reference to FIG. 16.

Figure 16:
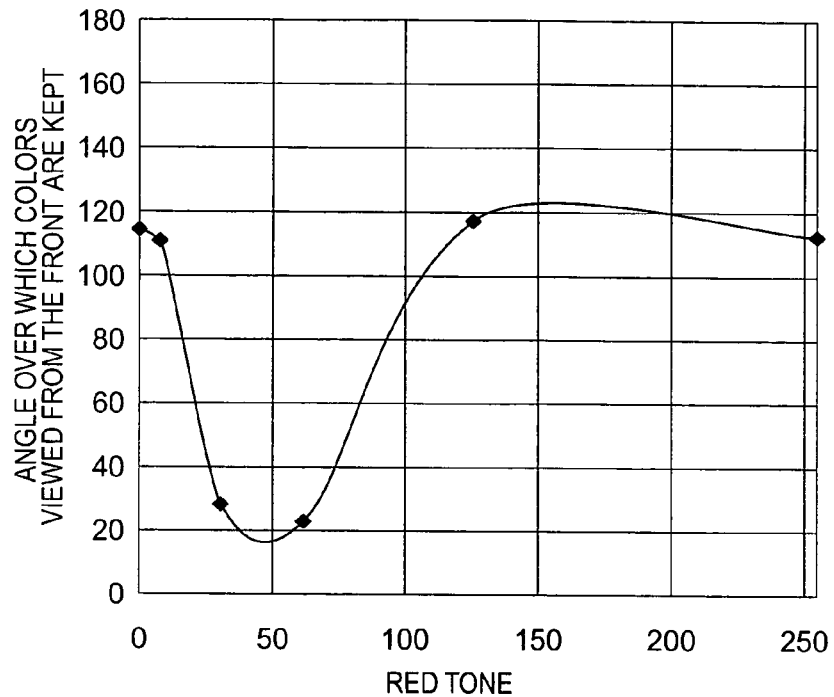
FIG. 16 is a graph showing a characteristic of a tone to a color difference field angle in the LCD 130.

FIG. 16 shows dependency of chromatic viewing angle characteristic upon tone in the case of using the VA system liquid crystal. An axis of abscissa denotes a red tone (a sole red color in this figure), while an axis of ordinate denotes a chromatic viewing angle characteristic described in the fourth embodiment. As is understood from FIG. 4, in the VA system liquid crystal used in this embodiment, the chromatic viewing angle characteristic is quite deteriorated in the area of 20 to 80 of overall 255 tones but is ameliorated in the other area.

In a case that the VA system liquid crystal is used for the LCD 130 like this embodiment, the chromatic viewing angle characteristic is kept excellent by mainly using the area except 20 to 80 of overall 255 tones for the tone area.

In this embodiment, for realizing the foregoing state, the controller 110 merely instructs the display data changing circuit 120 to define the display data to be outputted to the LCD 130 in a specific range of 100 or more of overall 255 tones.

As described above, like the third embodiment, the LCD apparatus according to this embodiment provides a capability of having a wider dynamic range of a displayed image and a wider gamut even in a low tone area and displaying a vivid image with no blur of a moving image. Further, since the changed display data to be outputted to the LCD mainly uses only a specific area except 20 to 80 in the tone characteristic, the LCD apparatus enables to widen an angle range over which a user visually senses the same colors as the colors appearing on the display when the user views the display from the front, thereby being able to enhance the image quality more. Further, the specific tone area that should be circumvented is determined on the specifications of the backlight unit, a retardation film and the LCD. If the change of these specifications varies the characteristic shown in FIG. 16, it is just necessary to change the specific area that should not be circumvented.

Sixth Embodiment

This embodiment is the same as the third embodiment except the following respects. In this embodiment, basically, like the third embodiment, the controller 110 controls a changing quantity of display data and a backlight quantity based on the signals from the light sensor 122 and the ambient light sensor 123. However, unlike the third embodiment, in response to an instruction from the controller 110, the display data to be outputted to the LCD 30 by the display data changing circuit 120 is changed so that the tone distributions of the colors are smaller than (shaped more uniformly than) the distributions of the display data of the colors before the change.

Figure 17:
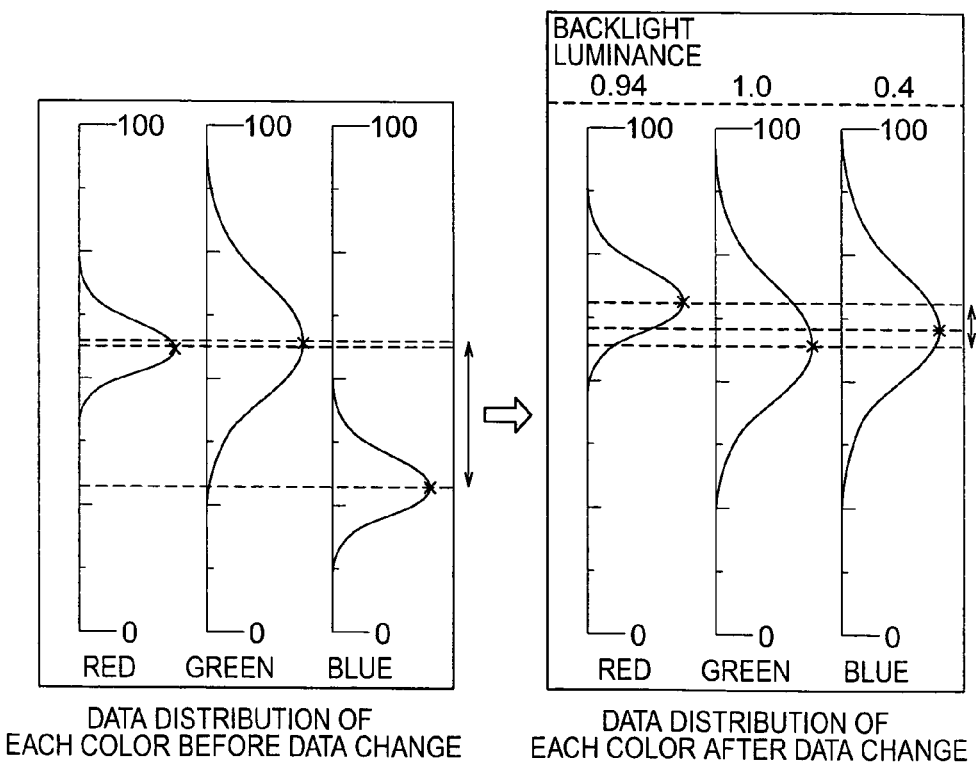
FIG. 17 is a graph showing an example of display data conversion.

FIG. 17 shows an example of the data change. The data tone distributions before change are variable in respective colors and thus are not correlated with one another. The data distributions after change are shaped so that the data distribution of each color may be located around the same tone. The reason why the data is to be changed will be described with reference to FIG. 18.

Figure 18:
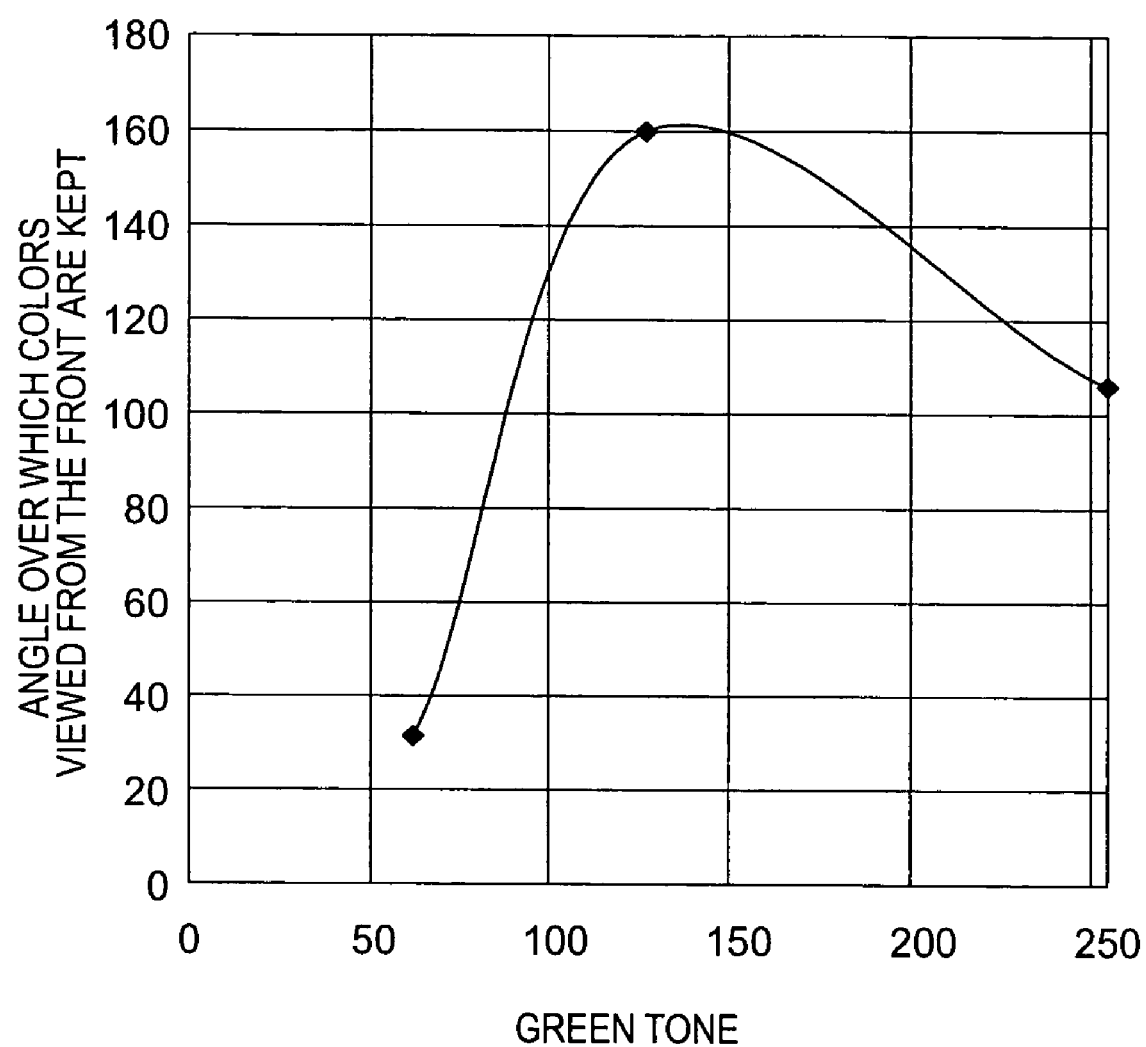
FIG. 18 is a graph showing a characteristic of a tone to a color difference field angle in the LCD 130.

FIG. 18 shows a chromatic viewing angle characteristic appearing when a green tone is changed in the condition that a red tone is 127/255 and a blue tone is 31/255 if the VA system liquid crystal is used in the LCD 130. As shown in FIG. 18, the chromatic viewing angle characteristic is excellent around 127 tone at which the green tone is matched to the red tone. In the case of using the VA system liquid crystal for the LCD 130 like this embodiment, by matching the red, the green and the blue tones to each other as much as possible, it is possible to keep the chromatic viewing angle characteristic excellent when the LCD apparatus is used.

In this embodiment, for realizing this state to some extent, the display data to be outputted to the LCD 130 by the display data changing circuit 120 is changed so that the tone distributions of the colors are smaller than (shaped more uniformly than) the distributions of the display data of the colors before change.

As described above, like the third embodiment, the LCD apparatus according to this embodiment provides a capability of having a wider dynamic range of a displayed image and a wider gamut even in a low tone area and displaying a vivid image with no blur of a moving image. Further, the LCD apparatus enables to widen the gamut in the low tone area and to control the display data after change to be outputted to the LCD so that the tone distributions of the colors are smaller than (shaped more uniformly than) the distributions of the display data of the colors before change. This control thus makes it possible to widen the angle range over which a user visually senses the same colors as the colors appearing on the display when the user views the display from the front, thereby being able to enhance the image quality more.

Seventh Embodiment

Figure 19:
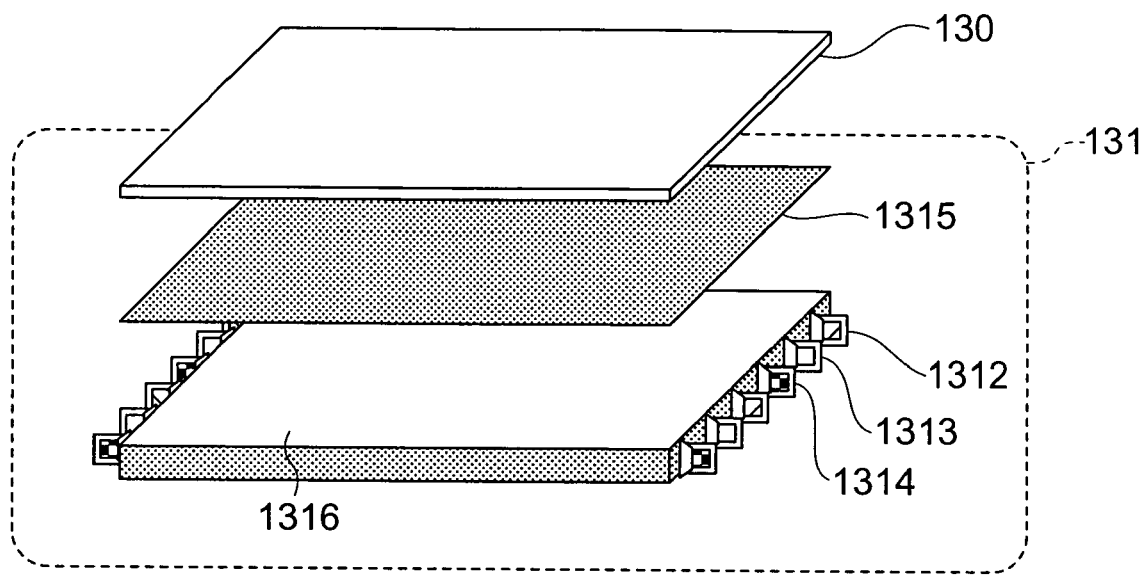
FIG. 19 is a view showing another composition of the LCD 130 and a backlight unit 131.
Figure 20:
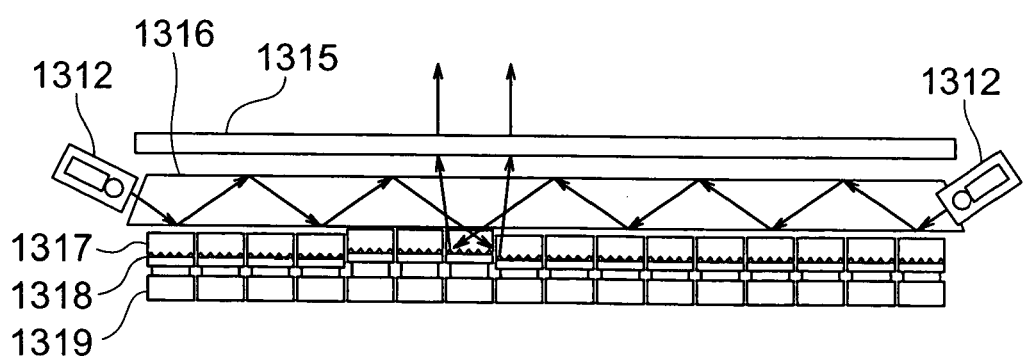
FIG. 20 is a view showing a composition of the backlight unit 131 shown in FIG. 19.

The present embodiment is the same as the second embodiment except the following respects. As in this embodiment, like the second embodiment, the red, green and blue light-emitting diodes are used as a light source of the backlight unit 131. However, unlike the second embodiment, these diodes are not located under the LCD 130. As shown in FIG. 19, a light pipe 1316 is located below the LCD 130 with a polarizing plate 1315 laid therebetween in a manner that the red light-emitting diodes 1312, the green light-emitting diodes 1313, and the blue light-emitting diodes 1314 are attached on the edges of the light plate 1316.

Those light-emitting diodes are variable in their characteristics, concretely, their light intensities and wavelengths are variable. In order to absorb a variety of those light-emitting diodes and properly mingle the rays of light emitted from the red, the green and the blue light-emitting diodes into a white ray of light, it is effective to make the light waveguide as long as possible. Since this embodiment uses an edge type location in which the light-emitting diodes are located on the edges of the light pipes 1316, the ray of light emitted from those diodes travels a long distance through the light pipe 1316, so that the variety of characteristics and the colors may be more easily arranged. This results in producing the backlight unit 131 that is less uneven in light and is excellent in spectral luminous characteristic.

Then, the use of the backlight unit 131 that is less uneven in light and excellent in spectral luminous characteristic makes it possible to more accurately control the changing quantity of display data and the quantity of backlight, thereby being able to widen the dynamic range of the display. Further, since the unnecessary backlight may be suppressed, the gamut is made wider, which leads to suppressing a blur of a moving image in displaying the moving image, thereby being able to enhance the display performance of the moving image more.

As described above, in this embodiment, the use of the edge type backlight unit makes it possible to provide a capability of widening the dynamic range of a displayed image and the gamut even in a low tone area and displaying a more vivid image with a less blur of a moving image. Hence, the LCD apparatus of this embodiment may suppress the "display unevenness" more.

Eighth Embodiment

The present embodiment is the same as the seventh embodiment except the following respects. In this embodiment, like the seventh embodiment, the backlight unit 131 utilizes the edge type location of its light source. However, unlike the seventh embodiment, under the light pipe 1316, the divided light pipes 1317 are located on the divided areas of the display. A reflection unit 1318 is located inside each divided light pipe 1317 and a drive unit 1319 is located under each divided light pipe so that each divided light pipe 1317 may be in contact with or off the light pipe 1316. This composition allows a ray of light entered from the edge portions of the light pipe 1316 to outgo only from the portion with which the divided light pipe 1317 contacts in the direction of the liquid crystal display.

In the foregoing composition, the pulse width modulation of the light-emitting diodes is controlled by making the diodes active or inactive. Further, the pulse width modulation is also executed by making each divided light pipe 1317 be in contact with or off the light waveguide 1316. In this case, it is not necessary to shorten the time when the light-emitting diodes are made inactive and reduce the number of the light-emitting diodes for securing the same light quantity. The reduction of the light-emitting diodes in number leads to suppressing a variety of characteristics of those diodes. In this embodiment, therefore, the backlight unit 131 has a more excellent spectral luminous characteristic. Moreover, the reduction of the diodes in number results in lowering the cost of the manufacture.

As described above, this embodiment makes it possible to locate the divided light pipes, each of which has a reflection unit to be in contact with or off the light pipe 1316, under the light pipe in the edge type manner and to divide the backlight unit into several areas on the plane, thereby being able to selectively control a backlight quantity. Hence, the reduction of the light-emitting diodes in number results in being able to make the luminous characteristic of the backlight unit more excellent, widen the dynamic range of a displayed image and the gamut even in a low tone area, display a more vivid image as suppressing a blur of a moving image, and lower the cost of the manufacture of the LCD apparatus.

Ninth Embodiment

The present embodiment is the same as the second embodiment except the following respects.

Figure 21:
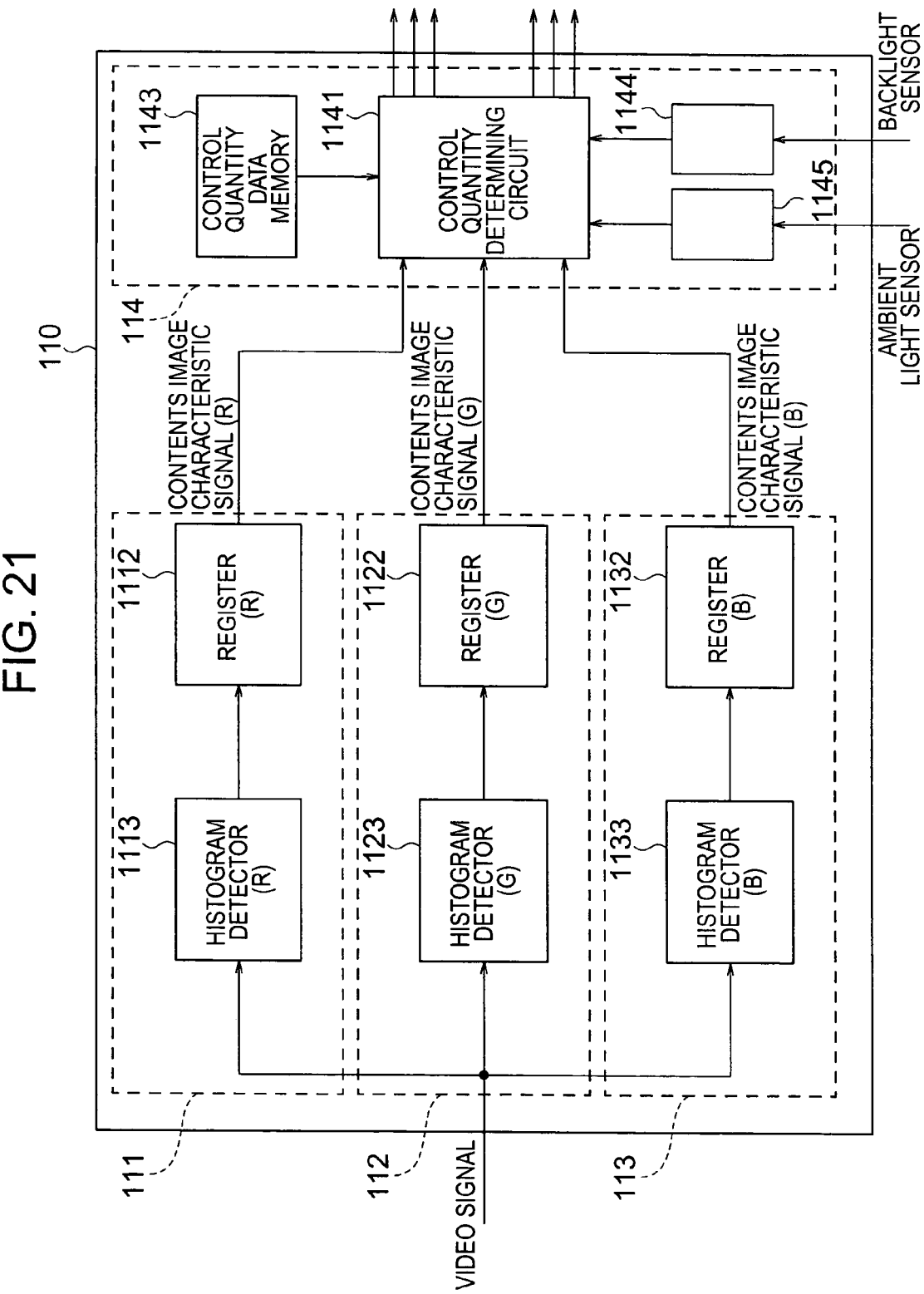
FIG. 21 is an internal block diagram showing a controller included in a ninth embodiment of the present invention.

FIG. 21 shows an internal block diagram of a controller according to this embodiment. The different respect of FIG. 21 from FIG. 14 is that the display contents analyzing circuit of each color includes a histogram detecting circuit for detecting a tone distribution of display data on one screen in place of the maximum/minimum detecting circuit.

Figure 22A:
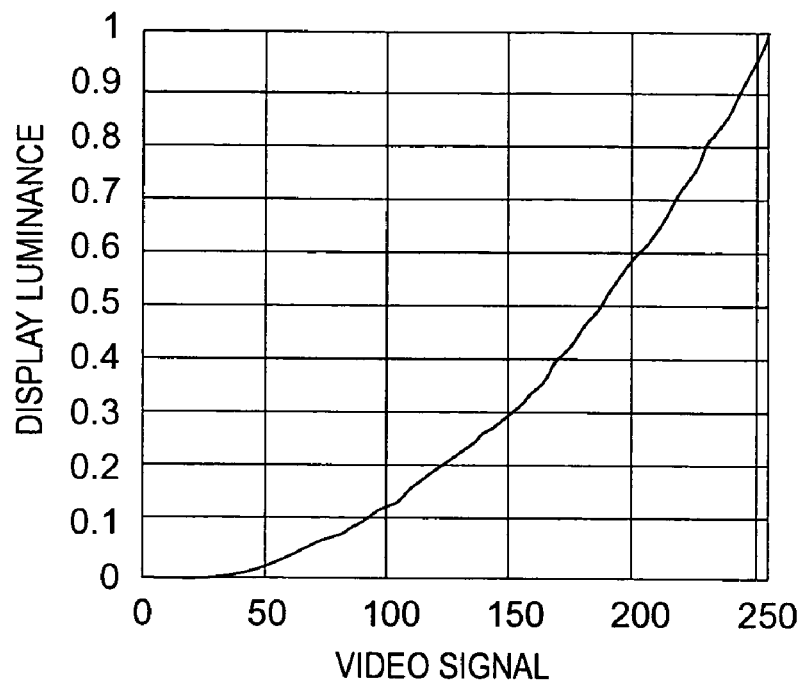
FIGS. 22A and 22B are graphs showing an input and output characteristic of the LCD apparatus and the backlight unit included in the ninth embodiment.
Figure 22B:
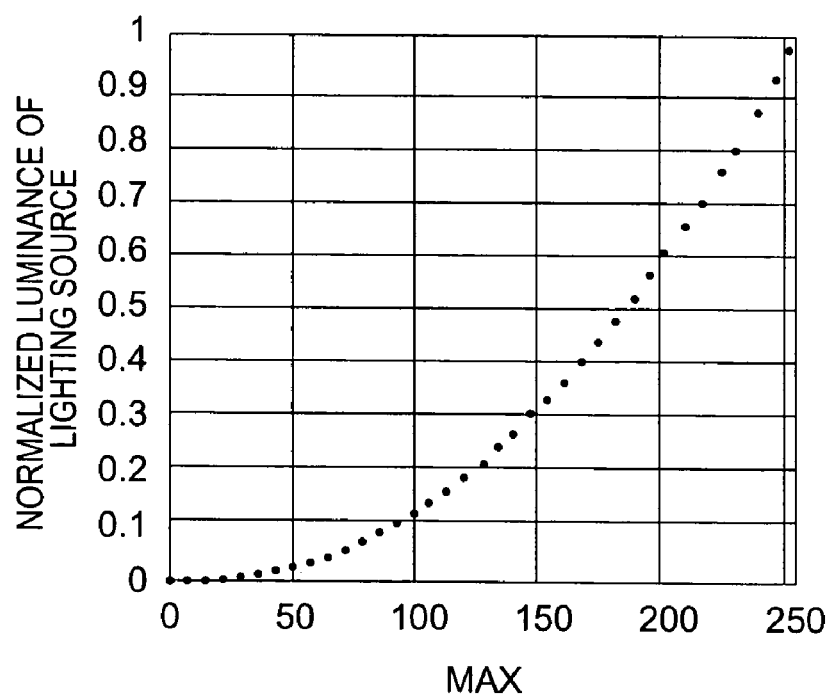

In general, the ideal relation between an image signal G (0 to 255) and a normalized display luminance B in which a maximum display luminance is 1 is the following expression as shown in FIGS. 22A, 22B:

$$B=(G/255)^\gamma \qquad \text{(expression 1)}$$

wherein a value of γ is specified as γ=2.2 in order to suit to the characteristic of the normal CRT. Hereafter, this characteristic is called a γ characteristic. The LCD apparatus normally operates to display an image by activating the backlight unit at a constant luminance and controlling a transmittance of the liquid crystal material. However, the liquid crystal panel has so insufficient a light cutoff performance that the relation between a video signal and a normalized transmittance T in which a maximum transmittance is 1 may be the following expression:

$$T=(G/255)^\gamma+\alpha \qquad \text{(expression 2)}$$

wherein α is an unnecessary transmittance. Concretely, the light leakage by α disadvantageously causes a black color to be too much emphasized and the gamut in a low tone display to be lowered. That is, it is quite difficult to represent the normalized transmittance through an ideal γ characteristic. Hence, by reducing the luminance of the backlight as much as possible, it is effective to suppress the light leakage by α. Further, by reducing the luminance to a minimum for each light source of the three RGB colors, it is possible to lessen the disadvantage caused by α more.

The conversion method used in this embodiment is described as follows. As will be described below, a conversion index setting circuit determines a video signal to be displayed at a maximum luminance of the inputted video signals of the three colors according to the output of the display contents analyzing circuit of each color and the output of the ambient light sensor detecting circuit 1145 and specifies the determined video signal as a conversion maximum tone point MAX. The backlight unit included in this embodiment uses the light-emitting diodes for a lighting source of each color and controls the luminance through the pulse width modulation. This backlight unit is specified to have a characteristic of:

$$L=(MAX/255)^\gamma \qquad \text{(expression 3)}$$

wherein L is a normalized luminance in which a maximum outgoing luminance of the lighting source of each color is 1. By selecting a video signal to be displayed at a maximum luminance from the inputted video signals and substituting the selected video signal as MAX in the following expression 4, it is possible to derive a minimum luminance of the lighting source. Correspondingly, the transmittance of the liquid crystal may be derived by converting the tone point MAX to be displayed at a maximum luminance into the video signal corresponding with the maximum transmittance. More generally, based on the condition that the display luminance before conversion is stored after conversion, the video signal G' after conversion is derived as follows:

$$G'=(255/MAX) \times G, \text{ wherein } G'=255(G'>256) \qquad \text{(expression 4)}$$

The expression 3 is a relatively complicated calculation including a powering calculation. Since it is the conversion expression of the lighting source, the conversion expression is executed simply at a frame unit (several tens Hz). The video signal conversion required for executing the calculation at a speed of pixel clocks (several tens MHz) may be composed of a simple multiplying circuit as shown in the expression 4. Hence, this conversion calculation does not put a heavy burden on the circuit.

Further, the heretofore described conversion does not consider correlation among the RGB colors described with respect to the first embodiment. This embodiment provides a capability of fine adjusting the backlight luminance output of each color and the output of display data, which have been described with respect to the first embodiment.

Figure 23:
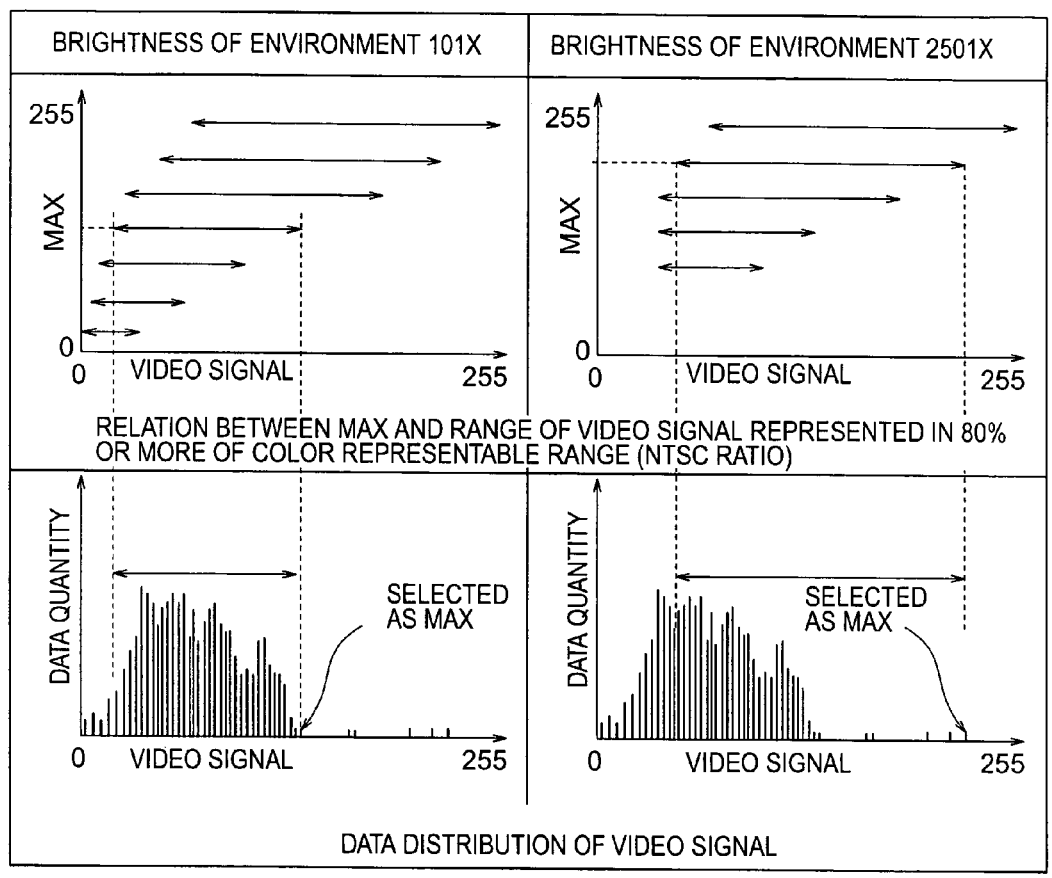
FIG. 23 is a view showing an example of a selecting method of a conversion maximum tone point MAX in the ninth embodiment of the present invention.

In turn, the description will be oriented to the method of setting MAX. In the upper part of FIG. 23 is illustrated the relation between the range of the video signal to be displayed and MAX as securing the gamut area on the chromaticity coordinates of 80% or more at an NTSC ratio. As is understood from FIG. 23, As the MAX becomes smaller, the gamut may be improved on the lower tone side. The range of the video signal to be displayed as keeping the gamut depends on brightness of the environment around the LCD apparatus. In general, as compared with the gloomy environment, the bright environment causes the gamut on the lower tone side to be lower. This is because the ambient light is reflected on the liquid crystal panel surface. The present embodiment is arranged to specify the optimal luminance of the lighting source according to the video signal and the brightness of the environment and thereby output a high-quality image. In the lower portion of FIG. 23 is illustrated a data quantity distribution of the video signal analyzed by the image analyzing circuit. The control quantity determining circuit 1141 calculates the range of the video signal to be displayed as keeping 80% or more of the gamut at each MAX value from the output result of the ambient light sensor detecting circuit 1145 and set the optimal MAX from the data quantity distribution analyzed by the display contents analyzing circuit.

In the embodiment shown in FIG. 23, in the gloomy environment wherein the brightness is 101×, the MAX is specified so that the maximum data quantity may be put into the video signal range where 80% or more of the gamut may be represented. In the bright environment wherein the brightness is 2501×, the MAX is specified so that the video signal to be displayed in 80% of gamut completely realizes 80% or more of gamut.

By the way, in this embodiment, for matrix-driving the LCD 130, a TFT (Thin Film Transistor) composed of amorphous silicon is used for the LCD 130. Further, the backlight sensor 122 and the ambient light sensor 123 are also composed of amorphous silicon and buried in the outmost peripheral portion of the LCD 130 on the same substrate as the TFT. The structures of this backlight sensor 122 and the ambient light sensor 123 are shown in FIGS. 24 and 25, respectively.

Figure 24:
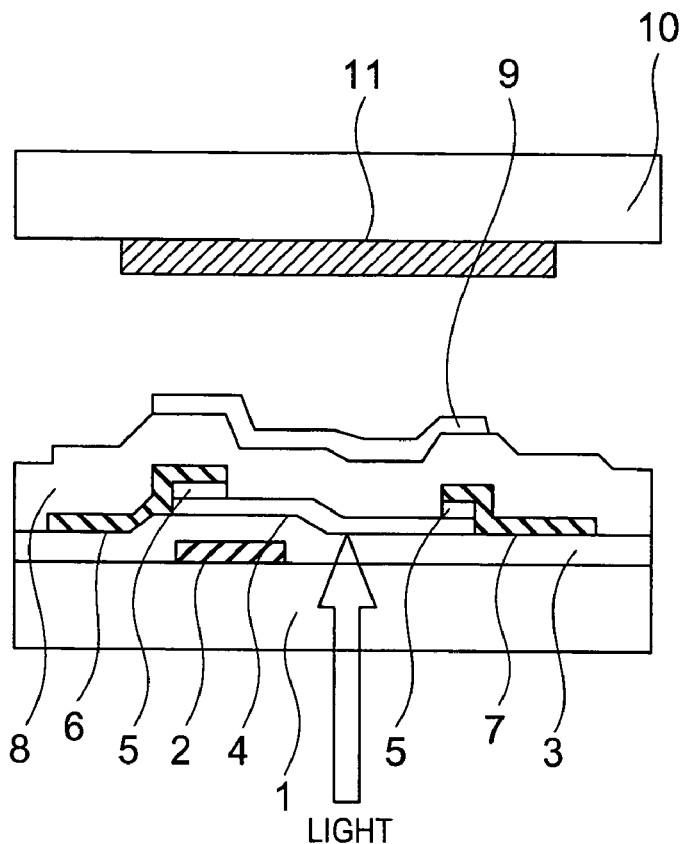
FIG. 24 is a view showing a composition of a light sensor of the backlight unit included in the ninth embodiment.

FIG. 24 shows the backlight sensor for sensing a ray of light applied from the substrate. By applying a minus voltage onto a shield electrode 9, it is possible to reduce dart current flowing through a transistor and lower the noise accordingly. By applying a plus voltage onto a gate electrode 3, it is possible to increase light current and improve a sensitivity accordingly.

Figure 25:
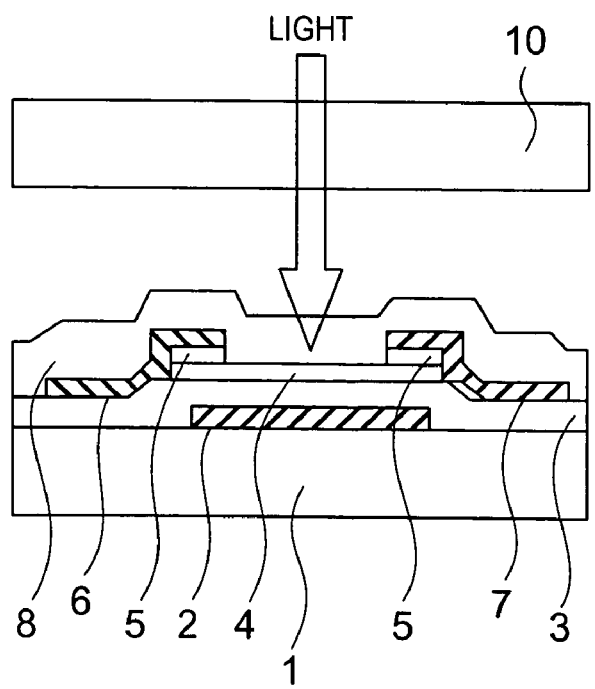
FIG. 25 is a view showing a composition of an ambient light sensor included in the ninth embodiment.

FIG. 25 shows an ambient sensor for sensing a ray of light applied from the opposite side. By applying a minus voltage onto a gate electrode 3, it is possible to reduce dark current and lower the noise accordingly.

Both of these sensors are inferior in performance to the commonly used optical sensor components. However, the performances of these sensors are high enough to sense the ambient light environment in a wide dynamic range or a quantity of light from the backlight unit located under the LCD as in this embodiment. Hence, the reduction of components in number makes it possible to lower the cost of the manufacture.

As set forth above, in this embodiment, the input and output characteristic of the LCD apparatus and the input and output characteristic of the backlight unit are both equal to the γ characteristic. Further, this embodiment provides the display contents analyzing circuit, the control quantity determining circuit 1141, and the ambient light sensor 123. The LCD apparatus of this embodiment thus executes the optimal conversion under various light environments so that the LCD apparatus may output the most excellent image. Further, the burial of the ambient light sensor and the backlight sensor in the liquid crystal display makes it possible to lower the cost of the manufacture.

Tenth Embodiment

The present embodiment is the same as the ninth embodiment except the following respects.

Figure 26:
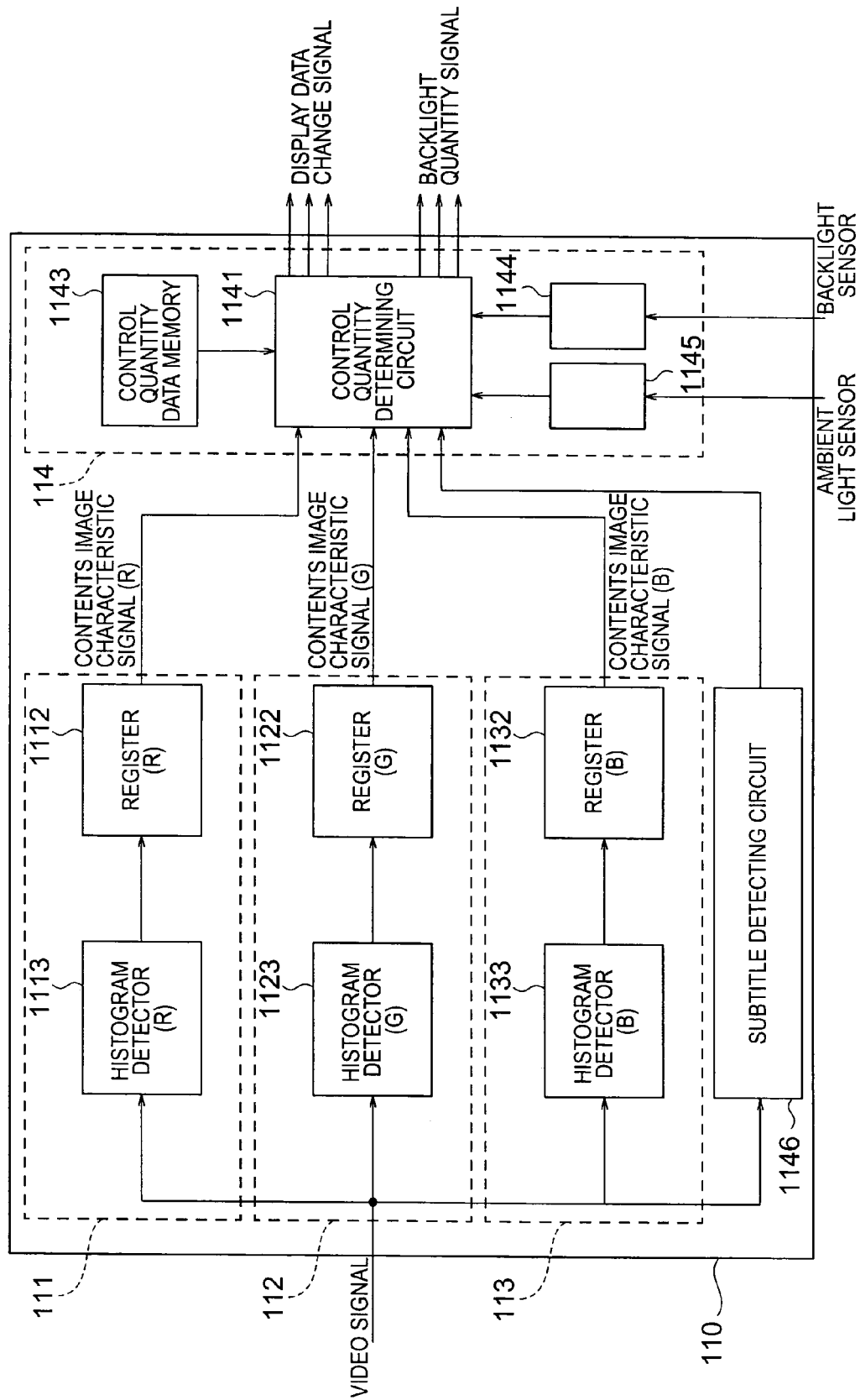
FIG. 26 is an internal block diagram showing a controller 110 included in the tenth embodiment.

FIG. 26 shows an internal block diagram showing a controller 110 included in this embodiment. The different respect of FIG. 26 from FIG. 21 is addition of a circuit 1146 for detecting subtitles.

In this embodiment, the addition of the subtitle detecting circuit makes it possible to reduce a luminance of a lighting source, thereby being able to enhance the image quality more.

Figure 27:
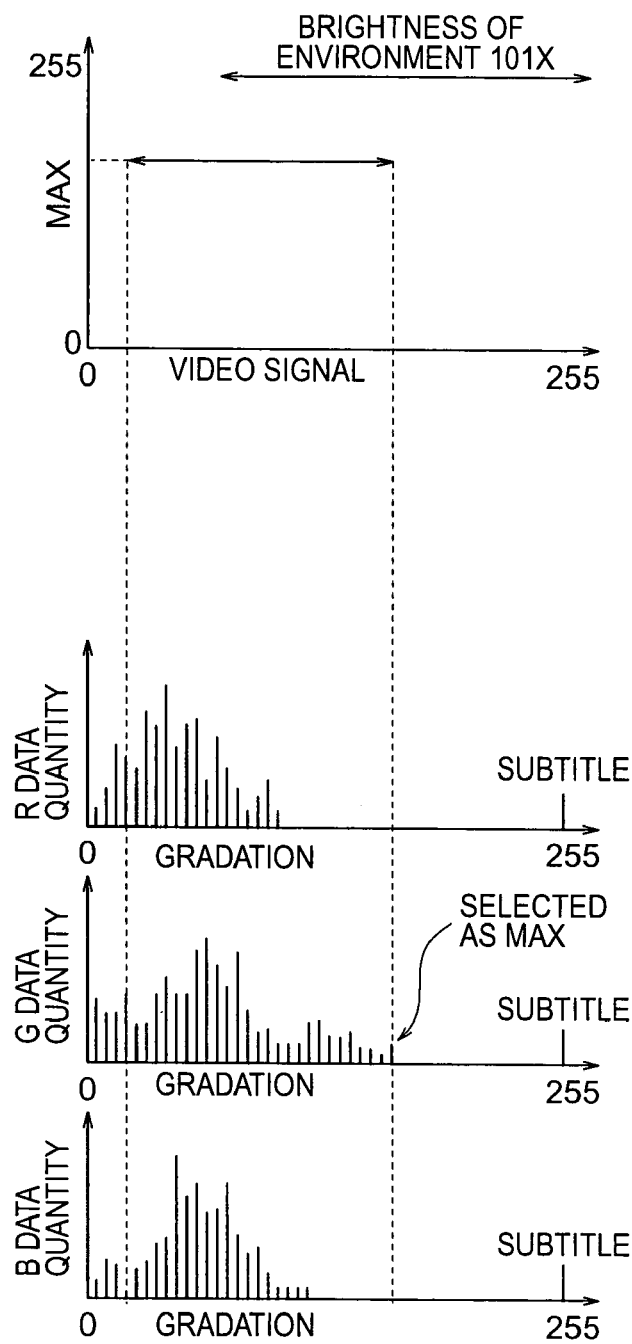
FIG. 27 is a graph showing an example of a selecting method of MAX in the tenth embodiment.

When a user watches a motion picture recorded on a DVD, translated subtitles often appear on the screen. The subtitles are composed of white characters and reproduced from the signal with the highest luminance, that is, the video signal (R, G, B)=(255, 255, 255). As shown in FIG. 27, for representing 255 tones, it is necessary to specify the conversion maximum tone point MAX as 255. This means that the luminance of the lighting source is maximum. Hence, it is difficult to enhance the quality of the image at lower tones. This difficulty is overcome by providing the subtitle detecting circuit 1146. The subtitle detecting circuit detects the corresponding signal with the subtitle from the inputted video signal and sends out the detected signal to the control quantity determining circuit 1141. In receipt of a signal with a subtitle from the subtitle detecting circuit 1146, the control quantity determining circuit 1141 calculates the MAX of each color from the video signal except the subtitle and determines the highest one of the MAX values of the RGB as a conversion index common to all the colors. The use of this type of algorithm allows the image except the subtitle to be displayed and the luminance of the lighting source to be lower as keeping the color of the subtitle white. Further, the user estimates the environment around the LCD apparatus and the brightness of the subtitle at his or her will, determines the allowable minimum brightness for the subtitle brightness against the estimated brightness of the environment around the LCD apparatus, and specifies a restrictive range to the MAX so that the subtitle brightness may be equal to or more than the determined brightness. This results in being able to display an easy-to-read subtitle. As described above, the addition of the subtitle detecting circuit makes it possible to reduce the luminance of the backlight unit, thereby allowing the LCD apparatus to output a more visually beautiful image and lower its power consumption.

Eleventh Embodiment

The present embodiment is the same as the tenth embodiment except the following respects.

The internal block of a controller 110 in this embodiment is the same as that of the tenth embodiment and further includes a subtitle detecting circuit 1146 as compared with the ninth embodiment.

The subtitle detecting circuit 146 detects the corresponding video signal with a subtitle contained in the video signal and then sends the detected signal to the control quantity determining circuit 1141. In receipt of the signal with a subtitle from the subtitle detecting circuit 1146, the control quantity determining circuit 1141 specifies a conversion maximum tone point MAX of each color from the video signal that does not concern with any subtitle. Herein, if the MAX is different in each of RGB, the subtitle is converted into a video signal (255, 255, 255) through the expression 3 and the black image is converted into (0, 0, 0). Hence, since the lighting source of one color of RGB has a different luminance from the lighting source of another color, the subtitle and the black image are colored. This is a problem.

Figure 28:
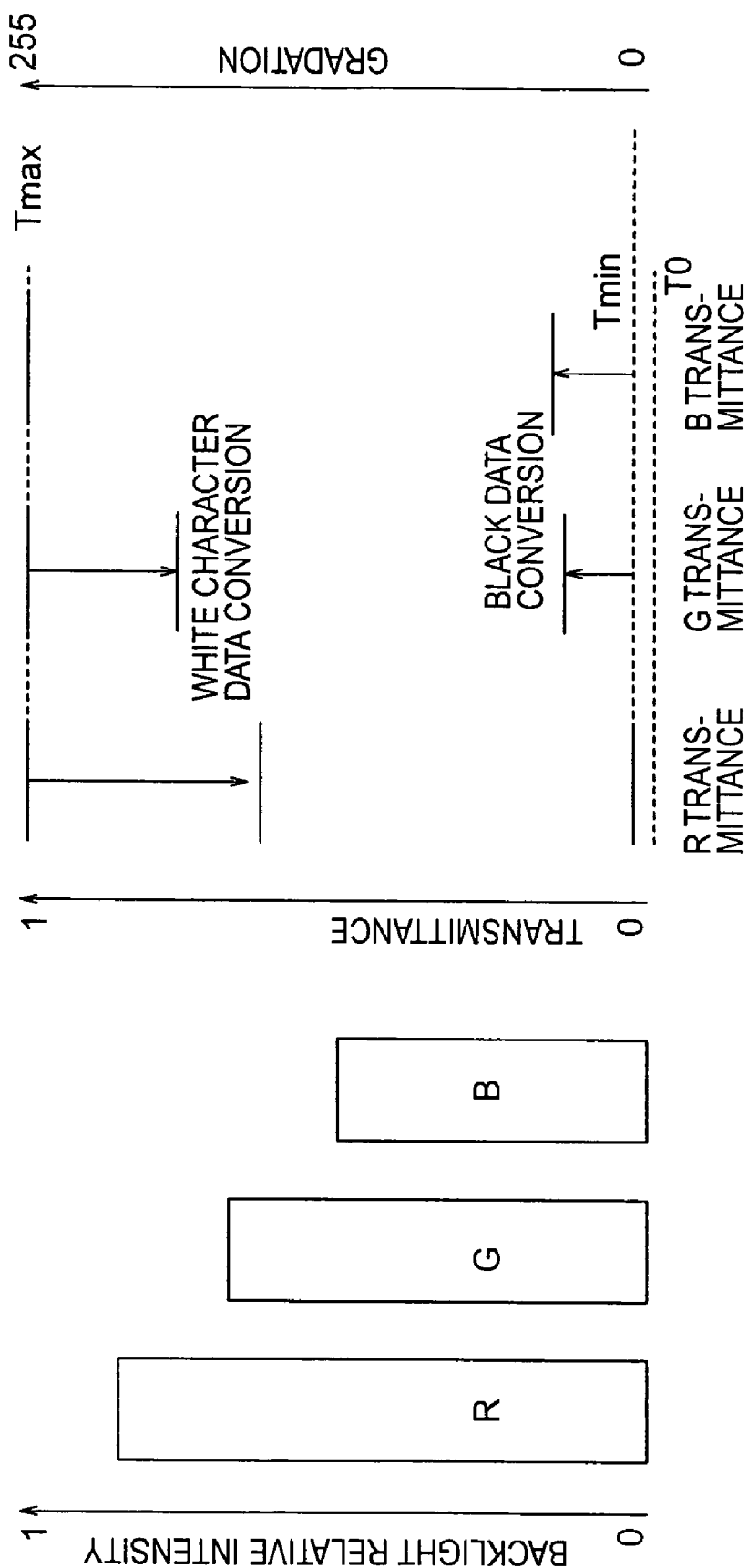
FIG. 28 is a view showing an example of display data conversion in the eleventh embodiment.

In this embodiment, this problem is solved by the luminance level conversions of the subtitle display tone and the zero tone. As shown in FIG. 28, assuming that the MAX of each color is R:230, G:200 and B:186, the relative luminance of the lighting source of each color is R:$(230/255)^{2.2}$=0.8, G:0.58, and B:0.5. That is, the relative luminances of the colors are different from one another, so that the white subtitle and the black image are colored by a transmittance of $\alpha$.

Hence, the coloring is overcome by the data conversion of the subtitle display tone and the data conversion of 0 tone, which will be described below. At first, about the white subtitle, the B video signal with the lowest MAX among the MAXes of the three colors is assumed to be 255. That is, it is assumed that the relative transmittance of liquid crystal is a maximum value, namely, 1 and a display luminance=relative luminance of lighting source×relative transmittance of liquid crystal=0.5. About the colors R and G, the transmittance of liquid crystal is determined through the signal conversion so that their relative luminances are made equal to the relative luminance 0.5 of B.

About 0 tone, the R video signal with the highest MAX among the MAXes of the three colors is assumed to be 0. That is, it is assumed that the transmittance of liquid crystal is $\alpha$ and a display luminance=relative luminance of lighting source×relative transmittance of liquid crystal=0.8×$\alpha$. About the colors G and B, the transmittance of liquid crystal is determined through the signal conversion so that their relative display luminances are made equal to the R relative display luminance 0.8×$\alpha$.

In a case that the control for a luminance of the lighting source is different in each of the RGB, the foregoing signal conversion makes it possible to display a high-quality image without coloring white subtitles and black images.

As described above, the LCD apparatus according to this embodiment provides the subtitle detecting circuit and realizes the display data conversion at the subtitle tone level and the 0 tone level, thereby being able to reduce the colored portions of the subtitles and the black image at 0 tone. This allows the image quality of the RGB apparatus to be higher.

Twelfth Embodiment

The present embodiment is the same as the ninth embodiment except the following respects.

Figure 29:
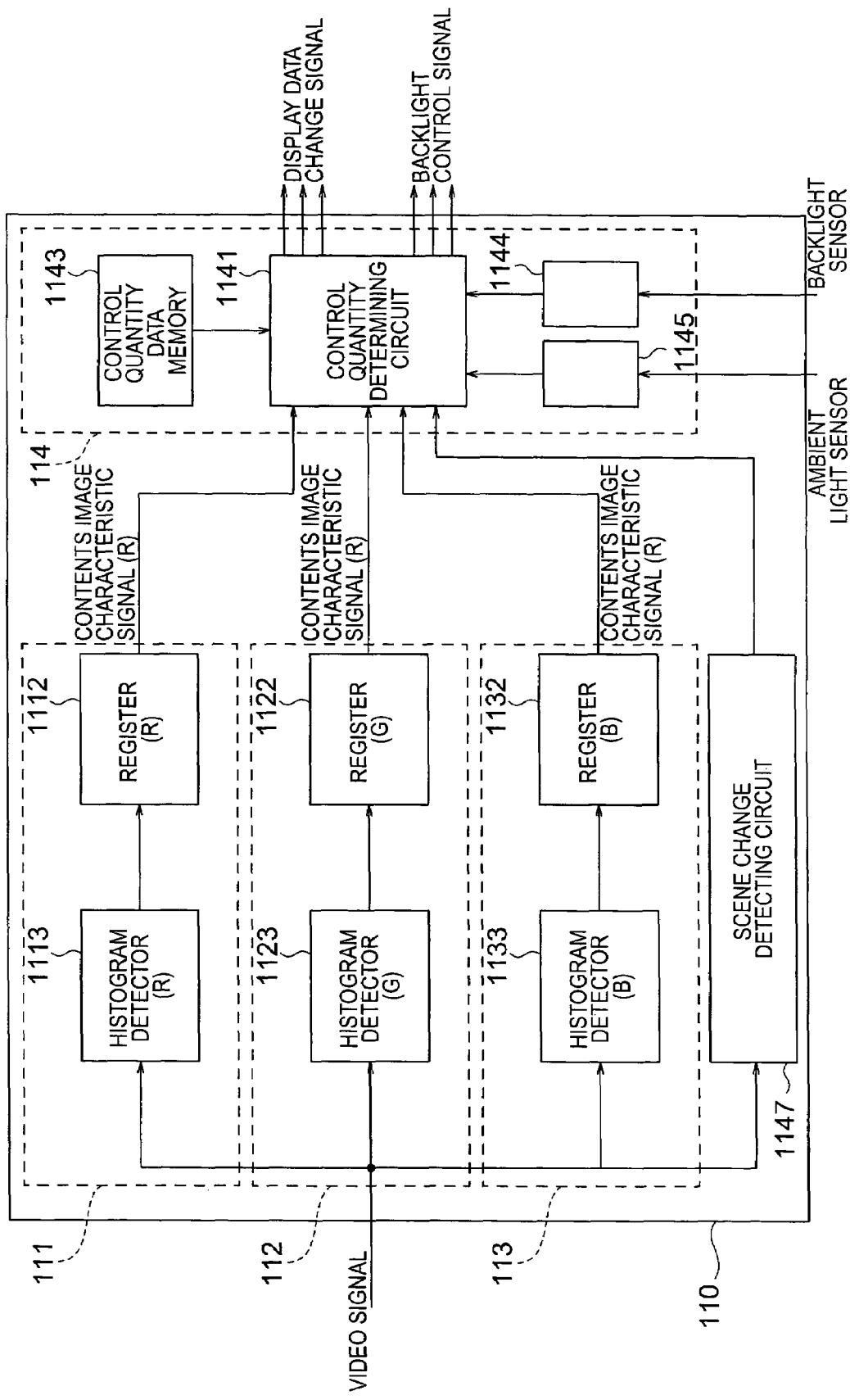
FIG. 29 is an internal block diagram showing a controller included in the twelfth embodiment.

FIG. 29 shows an internal block diagram of a controller 110 included in this embodiment. The different respect of FIG. 29 from FIG. 21 is addition of a scene change detecting circuit 1147.

The control quantity determining circuit 1141 specifies the optimal MAX of each color for each frame. The determination of the MAX only on the screen information at a frame may often bring about a disadvantage.

For example, it is assumed that a certain scene has a background and the lighting source varies its luminance according to the variation of luminance of an image except the background. In this case, the background area controls the transmittance of the liquid crystal so that the display luminance may not be changed according to the luminance variation of the lighting source. However, in the case of using the liquid crystal whose rising or falling response time is about 10 milliseconds and the lighting source composed of light-emitting diodes whose rising or falling response time is several microseconds, the light-emitting diodes instantly reach the target luminance according to the change of the MAX and the liquid crystal needs to take a significant length of time for one frame time (16.6 milliseconds) until the liquid crystal reaches the target transmittance. This phenomenon thus brings about a substantial shift between the conversion of the light source luminance and that of the liquid crystal transmittance, thereby often causing flickers on the display.

Figure 30:
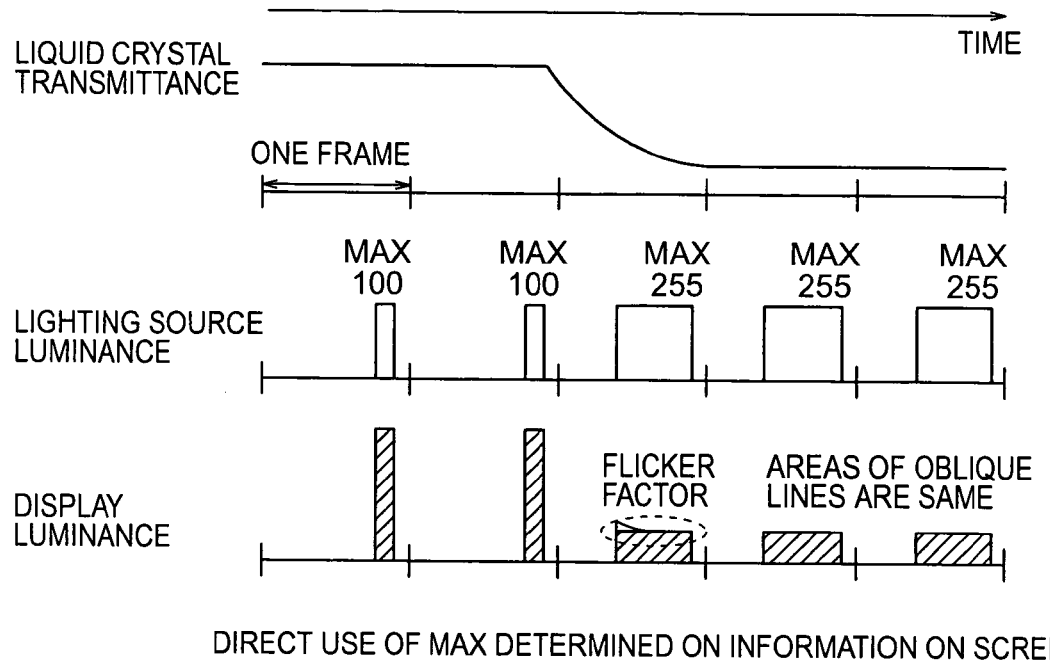
FIG. 30 is a view showing an example of display in a case that a MAX variation is not limited in the twelfth embodiment.

FIG. 30 shows the case that the luminance of the background is not changed according to the luminance variation of the lighting source. Assuming that the MAX is switched from 100 to 255, since the lighting source executes the pulse width modulation, the lighting source is activated at the corresponding pulse width with the conversion index 255. The liquid crystal lowers its transmittance so as to suppress the increase of the light quantity of the lighting source. The display luminance is derived by a product of a luminance of light transmitted through the liquid crystal and a transmitting time of light therethrough. The luminance of the background is not changed if the display luminance is kept equal in all frames. The portion indicated by oblique lines in FIG. 30 shows an ideal area of a luminance and a time in which the luminance of the background is not changed on the display.

Figure 31:
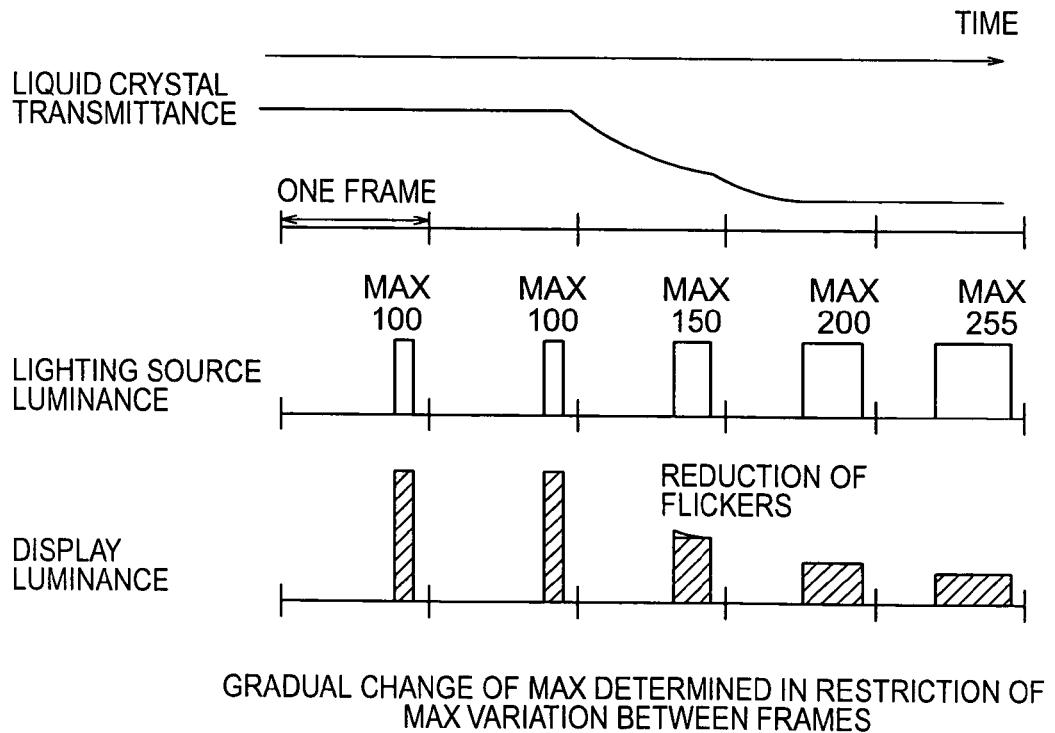
FIG. 31 is a view showing an example of display in a case that a MAX variation is limited in the twelfth embodiment.

However, since the response speed of the liquid crystal is not so fast, the luminance of the area extended off the area indicated by oblique lines appears on the display. It means that the abrupt change of the MAX often brings about flickers based on the difference of a response speed between the lighting source and the liquid crystal. In order to suppress occurrence of those flickers, as shown in FIG. 31, if the MAX is abruptly changed, it is effective to make the MAX of the previous frame gradually closer to the MAX of the current frame without directly converting the MAX.

In this embodiment, that is, the operation is executed to grasp the MAX variation difference between the adjacent frames in which difference no flickers takes place in advance and restrict the MAX on the time axis so that the MAX variation difference between the frames may be equal to or less than that measured difference.

In actual, the control quantity determining circuit 1141 compares the MAX of the previous frame with the MAX of the current frame and changes the MAX of the previous frame in the range where no flickers take place in the direction of making the MAX of the previous frame closer to the MAX of the current frame.

As described above, it is effective to suppress flickers on the same scene by restricting the MAX variation between the adjacent frames. However, only this measure cannot overcome the disadvantage caused in changing the scene. That is, when a new image is inputted, for realizing a visually proper display, it is better to get the MAX variation between the frames out of the restriction and to straightforward use the MAX determined by the control quantity determining circuit 1141.

In this embodiment, therefore, the scene change detecting circuit 1147 is provided for determining a scene change and switching a smaller allowable MAX variation between the adjacent frames or a larger one, based on the determined result.

That is, the scene change detecting circuit 1147 is arranged to reduce the allowable variation so that the MAX change between the frames on the same scene may not be abruptly changed and to increase the allowable variation for changing the scene through the use of the MAX determined only on the screen information or a closer value to the MAX.

FIGS. 32A, 32B, 32C show the MAX initially determined only on the screen information by the control quantity determining circuit 1141 and the MAX determined on the result of the scene change detecting circuit 1147 as alternately changing a smaller allowable MAX variation between the frames and a larger allowable MAX variation between the frames on the same scene.

Further, the scene change quantity outputted by the scene change detecting circuit 1147 is also indicated. Herein, the scene change quantity means a difference between the frames in the histogram of a video signal.

In a smaller scene change quantity (the same scene) calculated by the scene change detecting circuit 114, the MAX to be actually outputted is gradually changed as compared with the MAX determined only on the screen information. On the other hand, in a larger scene change quantity (scene change) calculated by the scene change detecting circuit 1147, the MAX calculated on the screen information by the control quantity determining circuit 1141 or a closer value thereto is used for the process.

As described above, the provision of the scene change detecting circuit and the restriction on the MAX variation between the frames in this embodiment makes it possible to switch the smaller allowable MAX variation between the frames or the larger one in the scene change, thereby being able to prevent flickers on the display and realize the conversion proper to the scene change. These result in enhancing the image quality more.

In addition, this embodiment concerns with the application of the features to the ninth embodiment. It goes without saying that the features of this embodiment may be applied to the tenth, the eleventh or another embodiment.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A liquid crystal display apparatus comprising:
    a liquid crystal display composed of a pair of substrates, a liquid crystal layer laid between said pair of substrates, a plurality of electrode groups for applying an electric field onto said liquid crystal layer, and a plurality of active elements being connected with said electrode groups and having a plurality of sub-pixel structures;
    a backlight unit arranged for controllable light emission of a plurality of colors, for applying a ray of light of each color onto said liquid crystal display;
    a controller for controlling a change of display data of each color on said liquid crystal display and a quantity of each color ray of light emitted from said backlight unit, based on an output signal sent from a backlight sensor for sensing light emission of said backlight unit and a video signal of each color being inputted for displaying the corresponding image on said liquid crystal display; and
    a subtitle detecting circuit for detecting a subtitle displayed on the liquid crystal display;
    wherein said controller determines a conversion maximum gray scale point MAX in accordance with a result of an analysis of a video signal of each color to be inputted for displaying onto said liquid crystal display, changes said display data so as to convert said inputted video signal at the MAX into a signal at a gray scale in which a liquid crystal transmittance becomes maximum, and lowers a backlight luminance output into a luminance level indicated by the MAX in said input and output characteristic;
    wherein no conversion of a 0 gray scale signal of each color in said inputted video signal is executed with respect to the color with the highest MAX and the conversion of said 0 gray scale signal of the remaining colors is executed so as to make the 0 gray scale of each color equal to a 0 gray scale luminance level at which the MAX becomes the highest; and wherein if the subtitle is detected, said conversion maximum gray scale point MAX is determined on an analyzed result of a video signal excepting a signal portion corresponding with said detected subtitle.

2. A liquid crystal display apparatus according to claim 1, wherein said backlight unit is composed of light-emitting diodes of three primary colors and the light emission of said backlight unit is controlled through the effect of pulse width modulation.

3. A liquid crystal display apparatus according to claim 1, wherein said display data changed for being outputted to said liquid crystal display uses portions of a gradation characteristic of said liquid crystal display.

4. A liquid crystal display apparatus according to claim 1, wherein said conversion maximum gray scale point MAX has a restricted inter-frame variation, and a convertible quantity if no scene change occurs is smaller than the convertible quantity if any scene change occurs.

5. A liquid crystal display apparatus according to claim 1, wherein said controller determines said conversion maximum gray scale point MAX in accordance with an image signal of each color imputed to be displayed on the liquid crystal display, an output signals from an optical sensor for sensing light emission of the backlight, and an output signals from an ambient light sensor.

6. A liquid crystal display apparatus comprising:
a liquid crystal display composed of a pair of substrates, a liquid crystal layer laid between said substrates, a plurality of electrode groups for applying an electric field onto said liquid crystal layer, and a plurality of active elements being connected
a controller for controlling a change of display data of each color on said liquid crystal display and a quantity of each color ray of light emitted from said backlight unit, based on an output signal sent from a backlight sensor for sensing light emission of said backlight unit and a video signal of each color being inputted for displaying the corresponding image on said liquid crystal display; and
a subtitle detecting circuit for detecting a subtitle displayed on the liquid crystal display;
wherein said controller determines a conversion maximum gray scale point MAX in accordance with an analyzed result of a video signal of each color to be inputted for displaying onto said liquid crystal display, changes said display data so as to convert said inputted video signal at the MAX into a signal at a gray scale in which a liquid crystal transmittance becomes maximum, and lowers a backlight luminance output into a luminance level indicated by the MAX in said input and output characteristic;
wherein no conversion of a 0 gray scale signal of each color in said inputted video signal is executed with respect to the color with the highest MAX and the conversion of said 0 gray scale signal of the remaining colors is executed so as to make the 0 gray scale of each color equal to a 0 gray scale luminance level at which the MAX becomes the highest; and
wherein, for a data signal representing the subtitle included in an inputted video signal, for the color with the lowest MAX of the colors, said data signal representing the subtitle is not converted, and for the remaining colors, said data signal is converted so as to make the maximum gray scale of each color equal to the maximum luminance level of the color with the lowest MAX.

7. A liquid crystal display apparatus according to claim 6, wherein said controller determines said conversion maximum gray scale point MAX in accordance with an image signal of each color imputed to be displayed on the liquid crystal display, an output signals from an optical sensor for sensing light emission of the backlight, and an output signals from an ambient light sensor.

8. A liquid crystal display apparatus according to claim 6, wherein said backlight unit is composed of light-emitting diodes of three primary colors and the light emission of said backlight unit is controlled through the effect of pulse width modulation.

9. A liquid crystal display apparatus according to claim 6, wherein said display data changed for being outputted to said liquid crystal display uses portions of a gradation characteristic of said liquid crystal display.

10. A liquid crystal display apparatus according to claim 6, further comprising a subtitle detecting circuit for detecting a subtitle displayed on the liquid crystal display, wherein if the subtitle is detected, said conversion maximum gray scale point MAX is determined on an analyzed result of a video signal excepting a signal portion corresponding with said detected subtitle.

11. A liquid crystal display apparatus according to claim 6, wherein said conversion maximum gray scale point MAX has a restricted inter-frame variation, and a convertible quantity if no scene change occurs is smaller than the convertible quantity if any scene change occurs.

* * * * *